US006428171B1

United States Patent
Aoki et al.

(10) Patent No.: US 6,428,171 B1
(45) Date of Patent: Aug. 6, 2002

(54) HEIGHT MEASURING APPARATUS

(75) Inventors: Masahiro Aoki, Tokyo; Chikara Abe, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/214,414

(22) PCT Filed: May 15, 1998

(86) PCT No.: PCT/JP98/02160

§ 371 (c)(1),
(2), (4) Date: Jan. 4, 1999

(87) PCT Pub. No.: WO98/51993

PCT Pub. Date: Nov. 19, 1998

(30) Foreign Application Priority Data

| May 16, 1997 | (JP) | 9-127189 |
| Sep. 22, 1997 | (JP) | 9-257284 |
| Sep. 24, 1997 | (JP) | 9-258550 |
| Mar. 13, 1998 | (JP) | 10-062707 |

(51) Int. Cl.[7] .............................................. G01B 11/24
(52) U.S. Cl. ................................. 354/608; 250/559.38
(58) Field of Search .............................. 356/376, 602, 356/608, 623, 624; 250/559.38

(56) References Cited

U.S. PATENT DOCUMENTS 4,548,504 A * 10/1985 Morander ................... 356/376
4,767,934 A * 8/1988 Stauffer ................... 250/559.38
5,168,327 A * 12/1992 Yamawaki ................... 356/376
5,978,089 A * 11/1999 Horovitz ..................... 356/376

FOREIGN PATENT DOCUMENTS

| JP | 63-61110 | 3/1988 |
| JP | 2-262004 | 10/1990 |
| JP | 2-306108 | 12/1990 |
| JP | 6-213658 | 8/1994 |
| JP | 6-221837 | 8/1994 |
| JP | 8-193810 | 7/1996 |

* cited by examiner

Primary Examiner—Richard A. Rosenberger
(74) Attorney, Agent, or Firm—Frishauf, Holtz, Goodman & Chick, P.C.

(57) ABSTRACT

A height measuring apparatus characterized by having an illumination optical system for illuminating the surface of an object, a pair of imaging optical systems having optical axis arranged symmetrical with respect to the optical axis of all light beam reflected by the object and designed to converging a part of the light beam along the optical axes, a pair of light-detecting optical systems arranged in a converging plane of the imaging optical systems and designed to detect light spots which change in position in accordance with the height of the object, and height calculator for generating spot-position signals from the light-intensity signals supplied from the light-detecting optical systems and calculating the height of the surface of the object from the spot-position signals.

24 Claims, 13 Drawing Sheets

//HEIGHT MEASURING APPARATUS

TECHNICAL FIELD

The present invention relates to a height measuring apparatus for use in measuring the height of a small object such as a read frame or a ball grid array (BGA).

BACKGROUND ART

Among the steps of manufacturing a semiconductor device is a step of measuring the height of small and continuous structures, such as the leads of a lead frame or the ball grids of a ball grid array to be mounted on a bare chip. In recent years there is the trend that semiconductor components have higher integration density and a larger size. This trend is accompanied by the demand for a height measuring apparatus that can make measurement at more points at higher speed.

Hitherto known as a height measuring apparatus is an apparatus that can measure a height at a point of measurement point by utilizing out-focus signals. This apparatus applies a light beam through an objective lens to the point of measurement. A beam splitter splits the light beam reflected from the point of measurement into two parts. One first part of the beam is applied through the first diaphragm arranged in front of a beam-condensing point. The first light-receiving element detects this part of the beam. The other part of the beam is applied through the second diaphragm located at the back of the beam-condensing point. The second light-receiving element detects the other part of the beam.

Thus structured, the apparatus can generates a plus/minus signal and an out-focus signal from the output signals of the first and second light-receiving elements. The magnitude of the plus/minus signal is zero (0) at the beam-condensing point, and has a positive or negative value at a point near the beam-condensing point. The out-focus signal has a magnitude that is proportional to the out-focus distance. Hence, the height at each point on an object can be obtained by moving the objective lens in the direction of the height until the magnitude of the out-focus signal becomes zero, and by measuring the height of the objective lens.

With the height measuring apparatus it is necessary to move the objective lens (or each point of measurement) up and down to measure the height at each point of measurement. Inevitably it would take a very long time to finish measuring the height at a number of measurement points, as is required in the electronic components developed recently. This may results in a decrease in the efficiency of manufacturing the electronic components.

DISCLOSURE OF INVENTION

The present invention has been made in view of the foregoing. Its object is to provide a height measuring apparatus which lessens the burden on the operator and which can achieve high operating efficiency.

The more detailed object of this invention is to provide a height measuring apparatus in which it is unnecessary to move the objective lens (or the point of measurement) up or down every time height is measured at one point.

Another object of the invention is to provide a height measuring apparatus, which has an optical system capable of reducing the cause of measurement error. In order to attain the objects mentioned above, a height measuring apparatus according to a first aspect of the invention comprises: an illumination optical system for sequentially illuminating a surface of an object; an imaging optical system having an optical axis spaced by a predetermined distance from an optical axis of all light beam reflected from the object, and designed to converge a part of the light beam along this optical axis; optical position-detecting device arranged in a converging plane of the imaging optical system, for detecting a light spot which changes in position in accordance with the height of the object; and height calculator for generating a spot position signal from a light-intensity signal supplied from the optical position-detecting device and for calculating the height of the surface of the object from the spot position signal.

With this arrangement it is possible to measure the height of the surface of the object on the basis of triangulation and, hence, to detect the height of the surface of the object continuously without the necessity of moving the stage or the like every time measurement is made at one point.

According to a second aspect of the invention, there is provided a height measuring apparatus of the type according to the first aspect, characterized in that the illumination optical system further comprises: a light source for emitting measuring light; an objective lens arranged, opposing the object, for converging the measuring light on the object; and a light-scanning mirror provided in a pupil plane or conjugate plane of the objective lens, capable of rotating, for applying the measuring light to scan the object, and the imaging optical system comprises: an optical-path branching optical system for separating a light beam reflected by the object, from the measuring light; a pupil relay lens system for projecting a pupil plane of the objective lens on a pupil projection plane; and an off-axis imaging lens arranged on the pupil projection plane on which the pupil has been projected by the pupil relay lens system, spaced from an optical axis of the pupil projection plane, and designed to focusing on the optical position-detecting device a part of the light beam extracted by the optical-path branching optical system, which passes a part of the pupil of the objective lens.

With this arrangement it is unnecessary to move the stage every measurement is made at one point, since the light-scanning mirror is moved. Thus, the height of the surface of the object can be detected continuously.

In this arrangement, the optical axis of the light beam output from the optical-path branching optical system can remain constant. An optical system having a small number of factors that may cause measurement errors can be constituted.

According to a third aspect of the invention, there is provided a height measuring apparatus of the type according to the first aspect, which further comprises: measurement possible/impossible determining device for determining whether it is possible to perform height measurement, on the basis of the light-intensity signal supplied from the optical position-detecting device.

In this arrangement, measurement possible/impossible determining means can determine whether height measurement can be performed at each measurement position. Hence, only reliable results of measurement can be output.

According to a fourth aspect of the invention, there is provided a height measuring apparatus of the type according to the first aspect, characterized in that a focusing-direction drive mechanism is provided for moving the imaging optical system and the object away from each other, thereby to control focusing/defocusing of illumination light with respect to the surface of the object, and that the height calculating section controls the focusing-direction drive mechanism in accordance with a height of a prescribed reference part of the object, thereby to control the control focusing/defocusing.

With this arrangement it is possible to measure the surface of the object in a substantially focused state, regardless of the difference in shape between the stage, the tray or the like that carries the object. Hence, all objects can be measured in substantially the same state, and the accuracy of measurement can increase.

If the object has a rough surface, measurement can be performed in a certain defocusing state.

According to a fifth aspect of this invention, there is provided a height measuring apparatus of the type according to the first aspect, which is characterized in that:

the other optical position-detecting device comprises a photoacoustic element for continuously changing a diffraction angle and a light-detecting element for detecting a light beam diffracted by the photoacoustic element, and the height calculating section calculates a change in the position of the spot on the basis of a signal generated by the light-detecting element and the diffraction angle detected by the photoacoustic element.

With this arrangement, the photodetecting element can be a photodiode having a high response speed. Hence, the height measurement can be effected at high speed.

According to a sixth aspect of the invention, there is provided a height measuring apparatus of the type according to the second aspect, characterized in that the light-scanning mirror is arranged between the optical-path branching optical system and the objective lens, an imaging lens is provided for focusing a light beam reflected by the object and branched by the optical-path branching optical system, on an intermediate image surface, an another objective lens of infinity design is provided for imaging again the image of the object formed near the intermediate image plane, and the off-axis imaging lens is arranged at the back focal plane of the objective lens of infinity design.

According to a seventh aspect of this invention, there is provided a height measuring apparatus of the type according to the first aspect, characterized in that:

the imaging optical system and the optical position-detecting device are arranged symmetrical to each other with respect to the optical axis of all light beams reflected by the object, the illumination optical system has:
a plurality of light sources;
a lens for projecting an image of each light source on the object; and
light-source image scanning device for turning on the plurality of light sources sequentially, thereby to scan the image of the light source on the surface of the object in a predetermined direction, and the height calculator calculates the height z of the surface of the object from a position x at which the image of the light source is projected on the surface of the object and positions δ1 and δ1 of light spots detected by the pair of position detecting elements.

In this arrangement, the light-source image scanning device for turning on the plurality of light sources sequentially. The height of the surface of the object can therefore be measured on the basis of the principle of triangulation. The stage need not be moved every time measurement is made at one point. The height of the object surface can be performed continuously.

BEST MODE OF CARRYING OUT THE INVENTION

The first to fifth embodiments of this invention will be described below, with reference to the accompanying drawings.

FIRST EMBODIMENT (Basic Structure)

Figure 1:
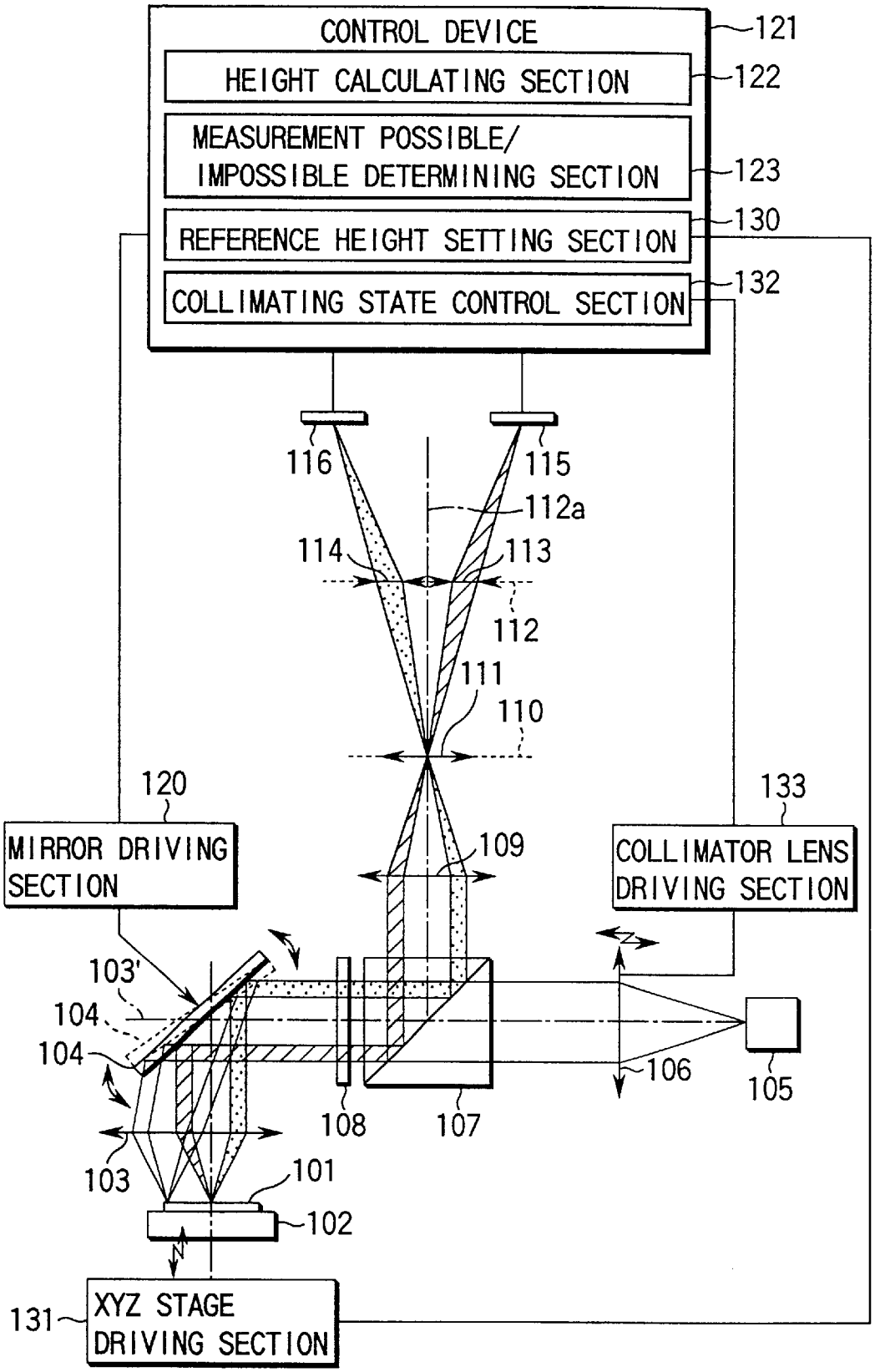
FIG. 1 is a schematic diagram showing a height measuring apparatus according to a first embodiment of the present invention.

FIG. 1 schematically shows a height measuring apparatus according to the first embodiment of the present invention.

In FIG. 1, reference numeral 101 designates an object. The object 101 is placed on an XYZ stage 102.

Above the stage 102 there is arranged an objective lens 103, which opposes the object 101. Used as the objective lens 103 is a telecentric lens of infinity design, which is provided on the object side. A galvano-mirror 104 is provided in the pupil plane 103', or conjugate plane, of the objective lens 103. The galvano-mirror 104 is rotated by a mirror driving section 120 around the pupil center in the pupil plane 103'. When swung in X direction (i.e., the direction along the plane of drawing), the mirror 104 applies measuring light, scanning the surface of the object 101 in the X direction. When swung in Y direction (i.e., the direction perpendicular to the plane of drawing), the mirror 104 applies measuring light, scanning the surface of the object 101 in the Y direction. FIG. 1 shows the galvano-mirror 104 swung in the X direction.

Reference numeral 105 denotes a laser diode. Provided in front of the laser diode 105 are a collimator lens 106, a polarized beam splitter 107, a quarter-wave plate 108, and the galvano-mirror 104 described above.

The collimator lens 106 converts a laser beam emitted from the laser diode 105 to a parallel light beam, which is applied to the galvano-mirror 104 through the polarized beam splitter 107 and the quarter-wave plate 108. The light reflected by the galvano-mirror 104 is converged by the objective lens 103 and applied, as measuring light, to the surface of the object 101. In this case, the measuring light is focused in telecentric fashion, forming a converged light beam having an NA determined by the pupil diameter and focal length of the objective lens 103. The converged light beam is applied at a given position on the object 101.

The measuring light reflected from the surface of the object 101 passes through the objective lens 103 and is reflected by the galvano-mirror 104. The light is then applied through the quarter-wave plate 108 to the polarized beam splitter 107. The polarized beam splitter 107 reflects the light and guides the same in a direction of an angle of about 90°.

An imaging lens 109 is provided in the reflected light path of the polarized beam splitter 107. Arranged near the image surface of the imaging lens 109 is a field lens 111. The field lens 111 and the imaging lens 109 constitute a pupil-relay lens system for projecting the pupil plane 103' of the objective lens 103 onto a pupil projection plane 112.

In the pupil projection plane 112 there are arranged a pair of imaging optical systems (hereinafter referred to as "first separator lens 113" and "second separator lens 114"), which are spaced from the optical axis 112a of the pupil projection plane 112 by a predetermined distance. The separator lenses 113 and 114 cooperate to form a spot of the measuring light on a first detector 115 and a second detector 116. The first separator lens 113 and the second separator lens 114 focus the measuring light which has passed through the different parts of the pupil of the objective lens 103, on the different focal points. The lenses 113 and 114 have the same optical characteristic.

Figure 2:
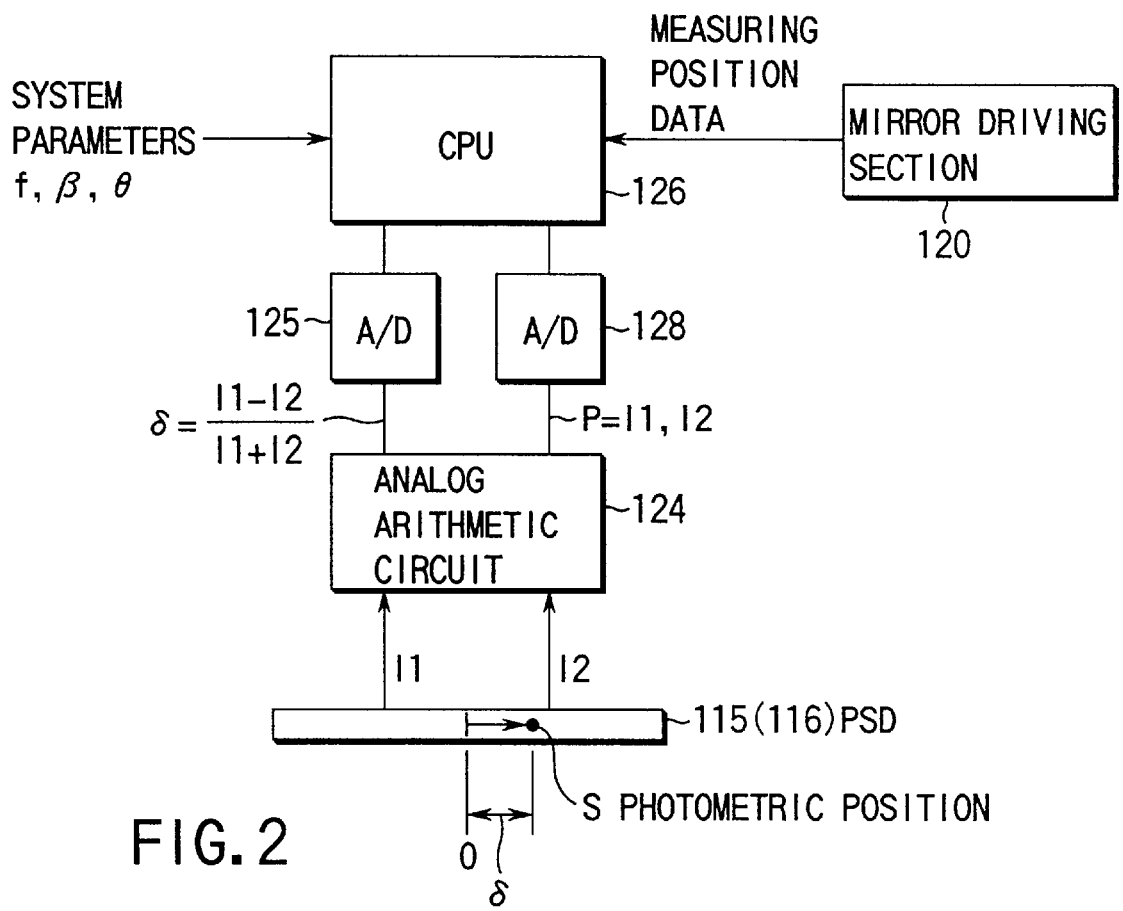
FIG. 2 is a block diagram explaining an arithmetic circuit for measuring height and determining whether measurement can be made.

The first and second detectors 115 and 116 are composed of a PSD (Position Sensing Device) each. As shown in FIG. 2, the PSDs generate current signals I1 and I2 (see FIG. 3A), respectively. Each current signal changes in accordance with the position S at which the measuring light is applied (i.e., the position of the spot). Changes in these signals change in symmetry with respect to the centers of the detectors 115 and 116.

As will be explained later in detail, the position S of the spot moves to the left or right, in accordance with the height of the object 101. In this case, the positions of the spot on the detectors 115 and 116 change in the opposite directions on the basis of the principle of triangulation.

The apparatus is equipped with a control device 121 shown in FIG. 1, in order to detect the height z of the object 101 in accordance with the changes in the position S of the spot. The control device 121 has a height calculating section 122. The height calculating section 122 calculates the height z at the surface of the object 101 on the basis of the coordinates (x, y) of the measuring position on the surface of the object 101 and the spot position signals generated by the detectors 115 and 116. The coordinate of the measuring position depends on the angle through which the galvano-mirror 104 has swung.

(Measurement Possible/Impossible Determining Section)

As mentioned above, the object 101 is a lead or a BGA. It is not always one with a flat surface. If the object 101 has dents and projections on the surface, the spot on the detectors 115 and 116 will expand to some degree, rendering it impossible, in some cases, to detect the spot accurately.

The measuring light may cover the effective aperture of the first separator lens 113, but may cover only a part of the effective aperture of the second separator lens 114. If so, the second detector 116 associated with the second separator 114 detects but the peripheral portion of the light spot. Not a small detection error will be made.

In such a case, it is reasonable to think it impossible to detects the height of the object 101 and to discard the detection results. In the present embodiment, the control device 121 comprises a measurement possible/impossible determining section 123, in addition to the height calculating section 122 described above.

(Reference Height Setting Section)

Objects 101 may be semiconductor substrates or the like on which BGAs (Ball Grid Arrays) or the like is formed. The tray or transport stage holding the objects is not always one with a high-precision flat surface. Hence, the objects 101 do not have their surface positioned at the same level. This may result in detection errors.

BGAs or the like differ in material and surface condition, depending on their uses. Some have mirror-like surfaces, and other have rough surfaces. For a BGA with a mirror-like surface it is desired that the focal point is located in the surface. For a BGA with a rough surface at which reflected light is scattered, however, a measurement error will likely occur in some cases if the focal point is located in the surface.

Therefore, a reference height setting section 130 is provided in this invention, to set an appropriate reference height in accordance with the condition. The reference height setting section 130 controls an XYZ stage driving section 131, which drives the XYZ stage 102, thereby detecting the height of a specific part of the object 101 and obtaining a reference height. The section 130 further drives the stage 102, thereby moving the surface of the object 101 to the reference height.

(Collimating State Control Section)

The dents and projections on the surface of the object 101 may have complicated shapes. If so, the light beams returning to the first detector 115 and second detector 116 will diverge due to the change in height, and the distribution of the light intensity will be greatly distorted. In this case, the gravity center of the intensity of the light spot will deviate, causing a measurement error.

To solve this problem, the control device 121 incorporates a collimating state control section 132. The collimating state control section 132 causes a collimator lens driving section 133 to drive the collimator lens 106 along the optical axis thereof. The collimating state is thereby controlled to either diverge or converge the light beam applied to the object. This makes the measuring light diverges on the surface of the object 101, whereby the influence of the dents and projections is mitigated.

The operations of the height calculating section 122, measurement possible/impossible determining section 123, reference height setting section 130 and collimating state control section 132 will be described in detail.

(Operation of the Height Calculating Section)

The principle and method of height calculation, which is performed by the height calculating section 122, will be explained in detail.

Figure 4:
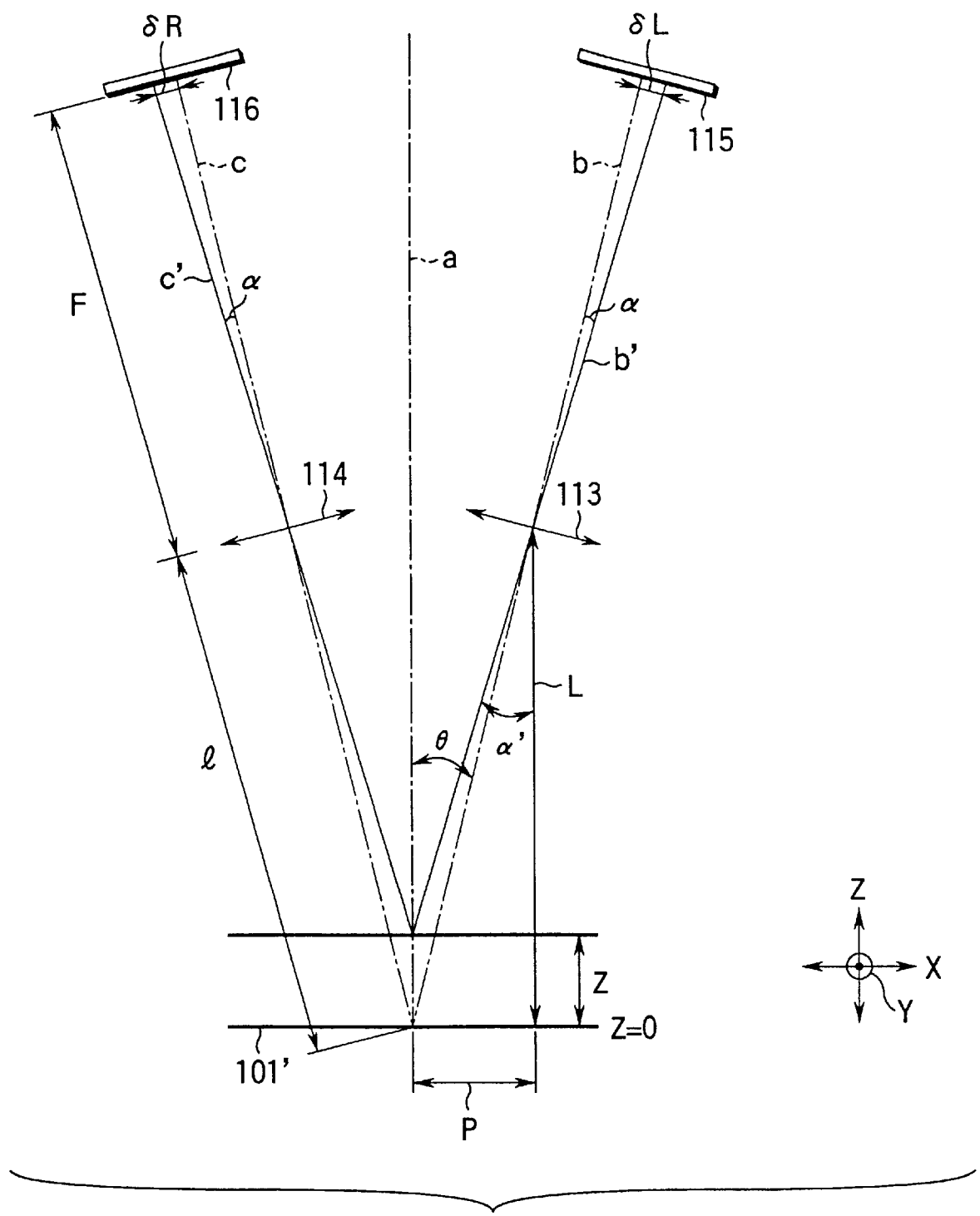
FIG. 4 is a schematic diagram for explaining the principle of triangulation.

FIG. 4 shows only that part of the apparatus which is located above the image surface 110 (FIG. 1) of the imaging lens 109. Here, the image surface 110 on which an image of the object 101 is projected is regarded as a new surface of the object. Hereinafter, the image surface 110 will be referred to as "object 101'." The components identical to those shown in FIG. 1 are designated at the same reference numerals.

Used as system parameters are the focal length f of the separator lenses 113 and 114, an imaging magnification β, and an angle θ between center axis a and the optical axes b and c of the separator lenses 113 and 114.

The lengths l of the optical axes b and c of the separator lenses 113 and 114, measured from the incident pupil plane of the lenses 113 and 114 are represented as follows:

$$l=f(\beta+1)/\beta \quad (1)$$

The lengths F of the optical axes b and c, measured from the emergence pupil plane of the lenses 113 and 114 to the centers of the detectors 115 and 116 are given as:

$$F=\beta l=f(\beta+1) \quad (2)$$

Positions δR and δL of the spots which the separator lenses 113 and 114 form on the detectors 115 and 116, respectively, from the light beam (reflected light) propagating from the height z (x is always 0) of the object 101' are opposite in direction. Nonetheless, the positions δR and δL are theoretically the same spot position δ. The position is expressed as:

$$\delta = F \tan \alpha \quad (3)$$

where α is the angle between a main optical axes b' and the optical axis b, and also between a main optical axis c' and the optical axis c.

The height L measured from the pupil centers of the separator lenses 113 and 114 to the surface of the object 101, where z=0, and the distance P between the center axis a and the pupil centers of the separator lenses 113 and 114 are represented as follows:

$$L=l \cos \theta, P=l \sin \theta \quad (4)$$

The angle α' between the perpendiculars from the pupil centers of the separator lenses 113 and 114 to the surface of the object 101', on one hand, and the main optical axis b' (or main optical axis c') is given as follows:

$$\alpha'=\tan^{-1}\{P/(L-z)\} \quad (5)$$

$$\alpha=\alpha'-\theta \quad (6)$$

Hence, the height z can be obtained as follows from the position signal (see FIG. 2) representing the spot S, by substituting equations (1) to (6) for one another:

$$z = \frac{F(L\tan\theta - P) - \delta(P\tan\theta + L)}{F\tan\theta - \delta} \quad (7)$$

It can thus be understood that the height can be calculated from the system parameters f, β and θ, and the spot position δ on the detectors 115 (116). This structure can calculate the height z by using the imaging optical system on one side only.

A method of calculating the height z of the object 101, which is based on the principle described above, will be explained below.

Figure 3A:
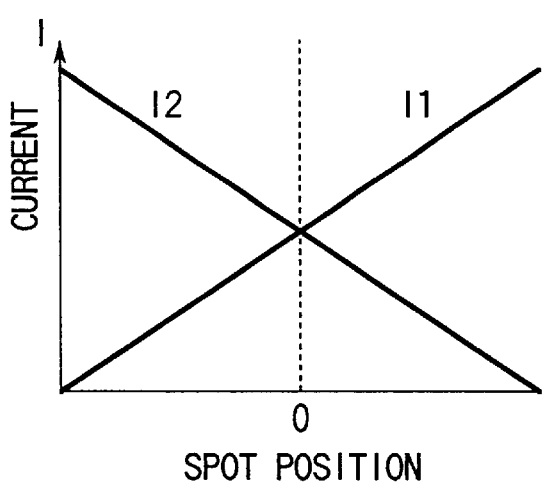
FIG. 3A is a waveform diagram explaining how detection signals from a PSD change.

As shown in FIG. 2, the control device 121 includes an analog arithmetic circuit 124. The analog arithmetic circuit 124 receives from the detectors 115 and 116, i.e., the SPD, the current signals I1 and I2 which change in accordance with the position of the spot S as illustrated in FIG. 3A. The circuit 124 generates a spot position signal δ, which is represented by the following equation:

$$\delta=(I1-I2)/(I1+I2) \quad (8)$$

Figure 3B:
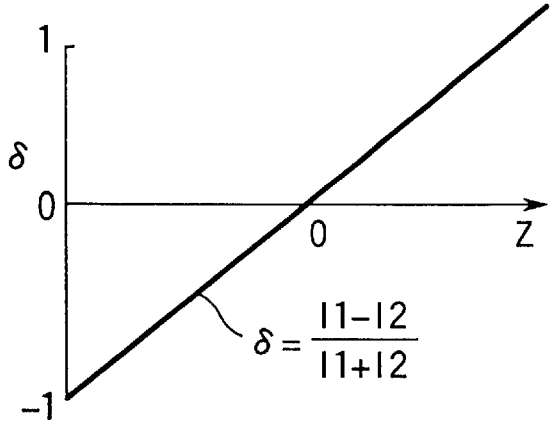
FIG. 3B is a waveform diagram explaining how a sum of detection signals from the SPD changes.

The spot position signal δ changes in accordance with the height z of the object 101 as illustrated in FIG. 3B. As shown in FIG. 2, the spot position signal δ is supplied to a CPU 126 via an A/D converter 125. The CPU 126 uses the system parameters f, β and θ and the measuring position data x, y sequentially input from the mirror driving section 120, and continuously outputs the height at various measuring positions. This makes it possible to measure height over a large area and a broad dynamic range, at high speed, without moving each optical system or the object 101 up or down.

In the present embodiment, the height calculating section 122 (CPU 126) uses the spot position signals δR and δL supplied from the first and second detectors 115 and 116, respectively, thereby finding z from the equation (7). The section 122 further adds the signals, thus obtaining the height z as follows:

$$z = \frac{2F(L\tan\theta - P) - (\delta 1 - \delta 2)(P\tan\theta + L)}{2F\tan\theta - (\delta 1 - \delta 2)} \quad (9)$$

Since the height z is obtained by using a pair of imaging optical systems, the detection sensitivity increases twice and the causes of errors are canceled. The precision can therefore be enhanced.

(Operation of the Measurement Possible/Impossible Determining Section)

How the measurement possible/impossible determining section 123 determines whether or not measurement can be performed will be explained in detail, with reference to mainly the flow chart of FIG. 5.

At first, in Step 5-1, the measurement possible/impossible determining section 123 determines whether or not the detectors 115 and 116 have acquired light much enough to achieve measurement, on the basis of the intensity of all light detected by the first and second detectors 115 and 116.

The object 101 may have extremely low reflectivity at some parts. If this is the case, accurate detection is impossible. Since the spot position signal δ is a differential signal, however, a normalized signal is output even if the amount of light detected is inadequate. As a consequence, erroneous measurement results may be obtained.

Therefore, a sum signal P expressed below is used to determine that the measurement cannot be achieved due to the insufficient amount of light:

$$P=I1+I2 \quad (10)$$

The signal P represents the intensity of all light applied to the detectors 115 or 116. The sum signal P is processed by the analog arithmetic circuit 124 and input to the CPU 126 through the A/D converter 128 shown in FIG. 2.

Figure 5:
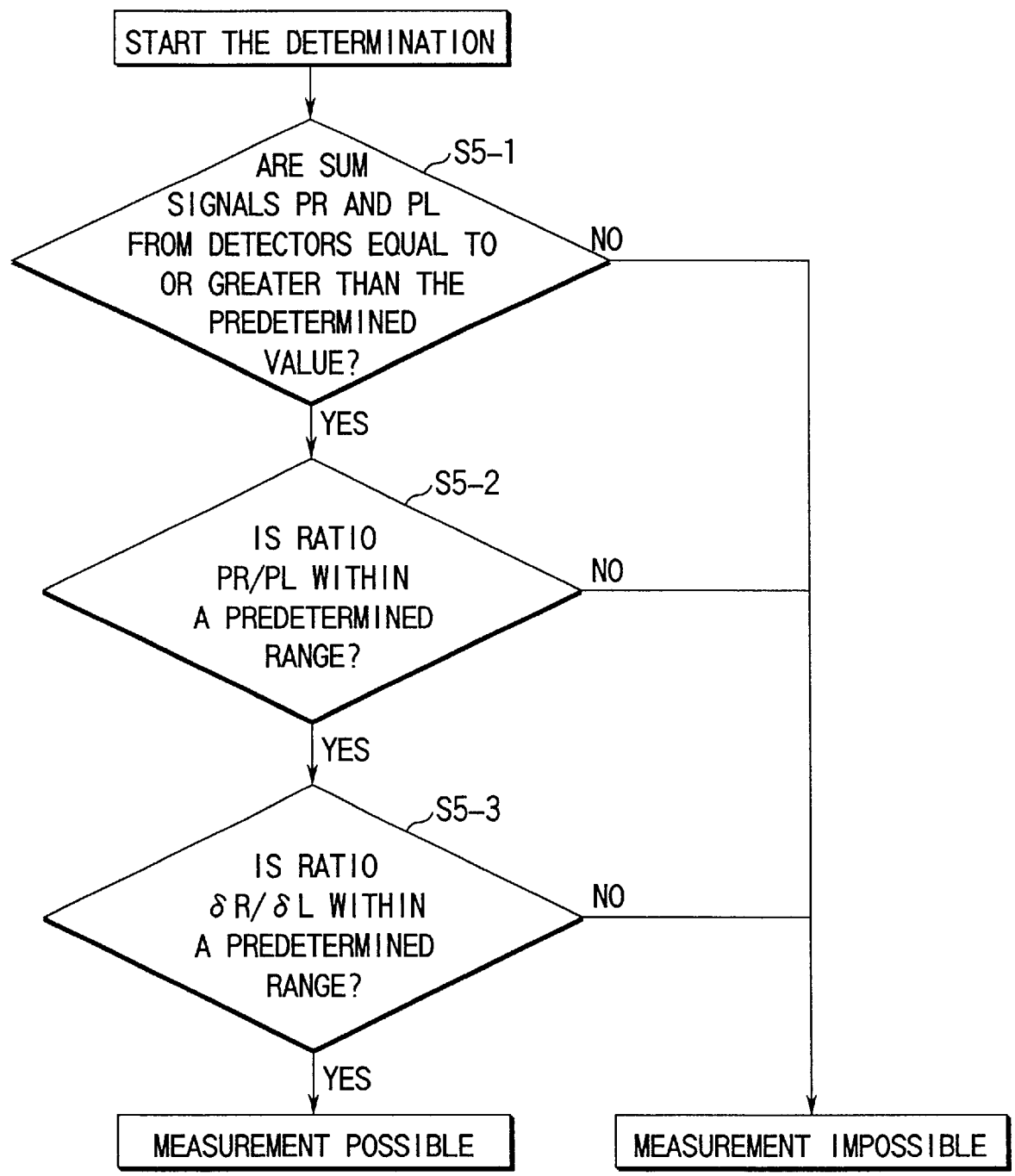
FIG. 5 is a flow chart illustrating the step of determining whether the height can be measured.

The CPU 126 determines whether the sum signals PR and PL supplied from the detectors 115 and 116 are is of an amount equal to or greater than a predetermined value I.th (Step S5-1), as is illustrated in FIG. 5. Thus it is determined whether or not measurement can be performed, in spite of the insufficient amount of light. In the case where only one imaging optical system is used as shown in the equation (7), it suffices to examine the amount of light PR or PL detected in the only one imaging optical system. In this case, Steps S5-2 and S5-3 are unnecessary.

In the process of measuring the height of the object 101, the light spot S moves in one direction on the detector 115 and in the opposite direction on the detector 116, but must assume the same distance. If the object 101 has dents and projections on its surface, however, the spot S may take greatly different positions on the detectors 115 and 116, respectively. In this case, no accurate measurement is accomplished.

To determine that measurement is impossible due to this, the ratio of the sum signal PR generated by the detector 115 to the sum signal PL generated by the detector 116 is calculated in Step S5-2. If the ratio PR/PL is 1, the detectors 115 and 116 receive the same amount of light, and accurate measurement can be carried out. If the ratio PR/PL greatly differs from 1, however, there may be a state which makes measurement impossible.

In view of this, it is determined in Step S5-2 that measurement is possible, if the ratio PR/PL falls within a range of, for example, 0.5 to 2.0. Hence, it is possible to determine whether or not measurement can be performed, thanks to the difference between the amount of light the detector 115 receives and the amount of light the detector 116 receives.

The light may be distributed in the spot S expanding to some degree, in one way at the detector 115 and in a different way at the detector 116, because the reflected light is minutely distributed on the surface of the object 101. The gravity center of the distribution of light amount, which is detected as spot position δ, may therefore differ between the detectors 115 and 116. In this case, measurement errors will occur due to the difference in terms of the distribution of light amount, even if the results of the decisions in Steps S5-1 and S5-2 are affirmative.

Therefore, in Step S5-3, it is determined whether the ratio between the spot position signals δR and δL in their absolute values falls within a predetermined range, in order to determine whether or not measurement is possible. If the ratio falls outside the range, the data representing the height is discarded. In the case of, for example, the following relation, it is determined that measurement is impossible:

$$0.9 > |\delta R|/|\delta L| > 1.1 \tag{11}$$

The measurement possible/impossible determining section 123 performs Steps S5-1 to S5-3, and the results of the measurement made at the measurement points where measurement is regarded as impossible are discarded. Only the height measured, which is reliable, is output.

To inspect a BGA or bumps, in particular, height data for all points on solder balls constituting the BGA or all points on each bump is not required. Rather, it suffices to measure the levels of the tops of the solder balls in the case of a BGA, or to measure the levels of the tops or flat parts of the bumps. Hence, the accuracy of inspection will increase if the data of low reliability is disregarded as much as possible. Therefore, the present embodiment can continuously measure the height z at various parts of the object 101 only if the galvano-mirror 104 scans the object 101 with measuring light. The embodiment can accomplish height measurement more efficiently than the conventional apparatus in which the stage is scanned every time the height z is measured at one position and the stage is moved to the next measurement point. The embodiment can measure height at many measurement points of an object such as the recently developed electronic component which has many elements arranged in a high density and which tends to be larger, with high accuracy within a short time. The embodiment can, therefore, lessen the burden on the operator and can achieve high operating efficiency.

The measurement possible/impossible determining section 123 determines whether or not measurement can be made, and height measurement data of low reliability is discarded. The embodiment can therefore accomplish height measurement with high reliability and is therefore advantageous.

(Operations of the Reference Height Setting Section and Collimating State Control Section)

As indicated above, many objects 101 of the same shape to be inspected are arranged on a tray or the like and transported, one after another, to a position below the objective lens 103.

The tray or a transport stage holding the objects 101 is not always one with a high-precision flat surface. Consequently, the objects 101 do not have their surface positioned at the same level. This may result in detection errors.

Figure 8:
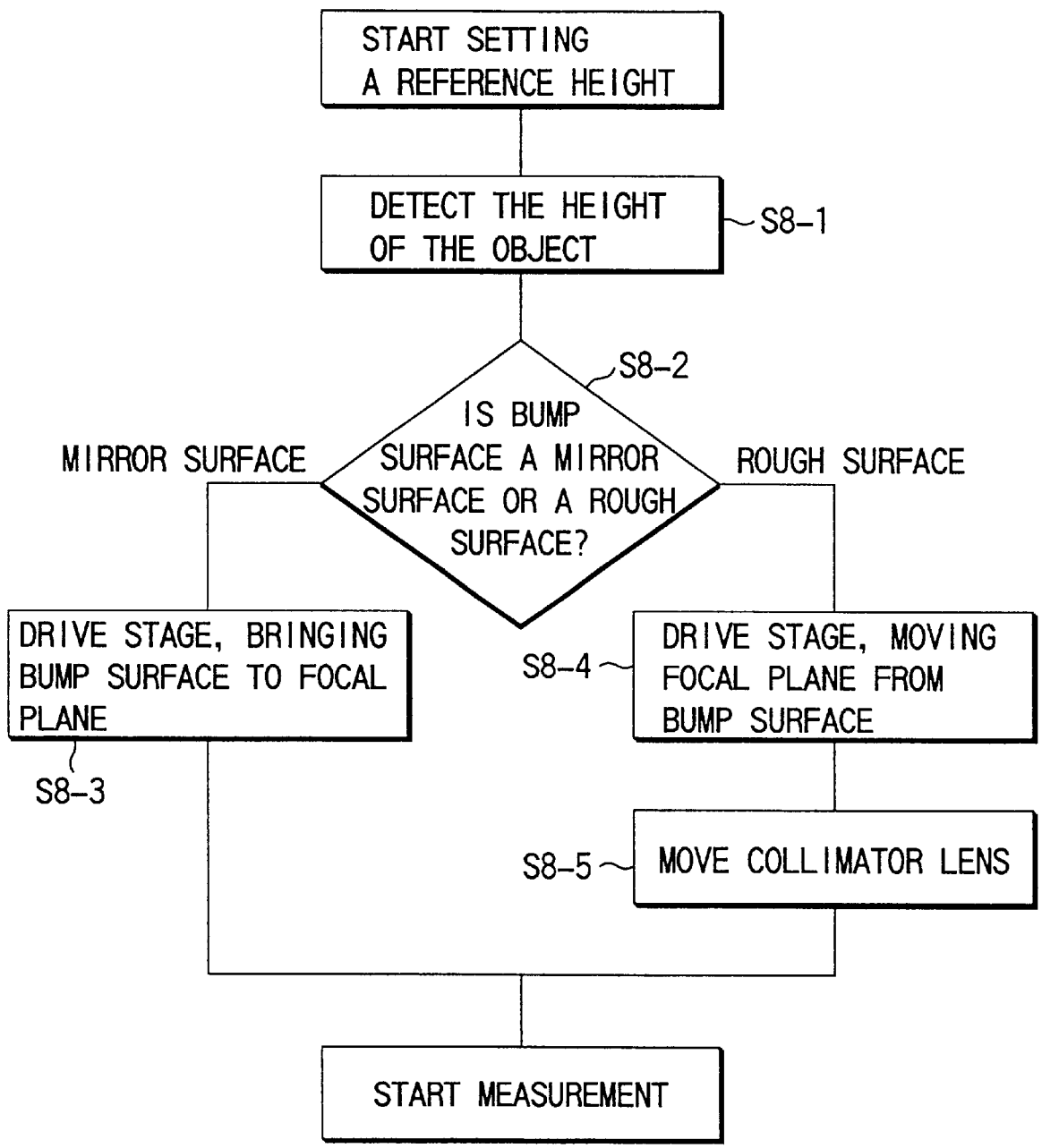
FIG. 8 is a flow chart depicting the procedure of setting a reference height.

The present invention therefore employs the detection procedure illustrated in the flow chart of FIG. 8.

Figure 6:
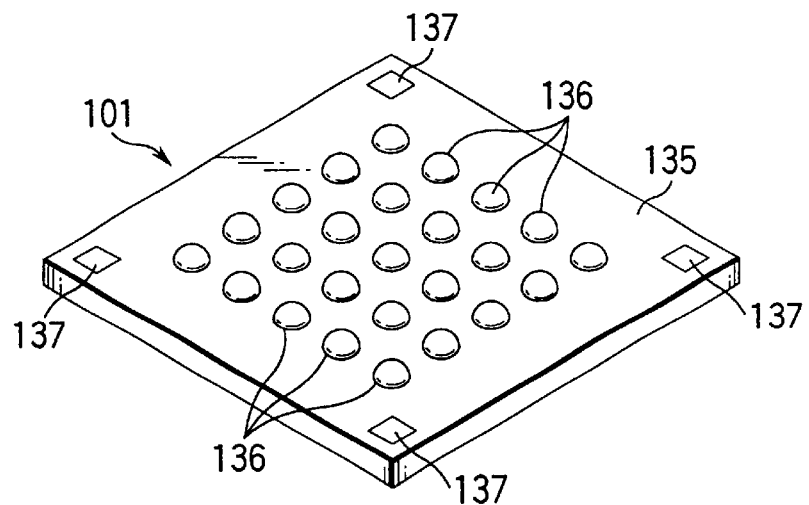
FIG. 6 is a perspective view of an object to be measured.

Fist, in Step S8-1, the height of a reference part of the object 101 is detected. FIG. 6 shows an example of the object 101 to be measured. A number of solder balls or bumps (BGAs) 136 are arranged on a semiconductor substrate 135. The parts of the semiconductor substrate 136, which have a relatively high reflectivity, or patter marks made of material having high reflectivity are used as reference parts. The reference parts 137 are provided at prescribed positions, in accordance with the type of the object 101.

The reference height setting section 130 incorporated in the control device 121 controls the XYZ stage driving section 131 and the galvano-mirror driving section 120 when the object 101 is transported to a position below the objective lens 103. The spot formed by the measuring light applied from the objective lens 103 is thereby located at one reference part 137, then at another, further at still another, and so on.

Next, the height calculating section 122 measures the height of the respective reference parts 137, in accordance with the equation (9). The reference parts 137 provided at various positions on the substrate 135 may be measured, and the average height measured of them may be determined as the height of the surface of the substrate 135.

Further, it is determined whether or not the surface of bumps 136 is mirror surface or rough surfaces (Step S8-2). This step is performed after the operator has made a decision and input the decision.

Figure 7A:
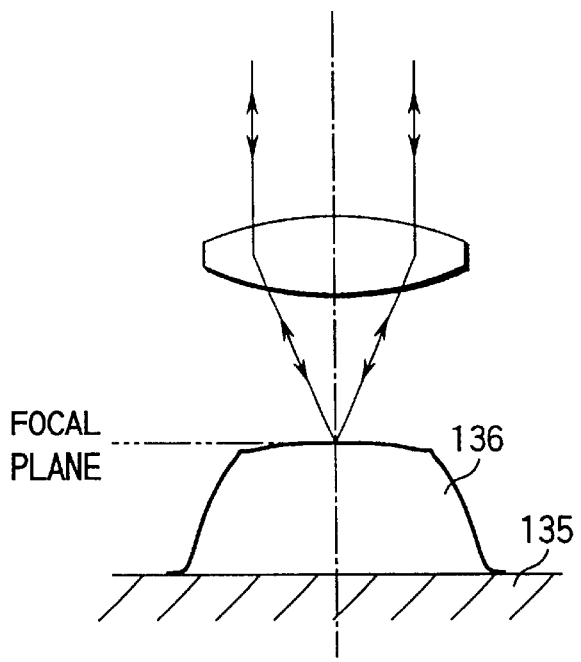
FIG. 7A is a schematic diagram showing a beam focused.

If the surface of the bump 136 is a mirror surface, the XYZ stage 102 is driven in the Z direction until the top of the bump 136 is positioned substantially in the focal plane of the objective lens 103 (Step S8-3, FIG. 7A). Here, it suffices to drive the XYZ stage 102 in accordance with the average height of the bumps 136 formed on the object 101 to be measured.

The surface of the bump can thereby be detected in an in-focus condition.

If the surface of the bump 136 is a rough surface, the position of the focal plane is set off from the surface of the bump 136. If measurement is made in the condition shown in FIG. 7A when the surface of the bump 136 is rough, the reflected light may not reach if the measuring spot is smaller than the cycle of dents and projections on the surface. In this case, a measurement error may be made.

Figure 7B:
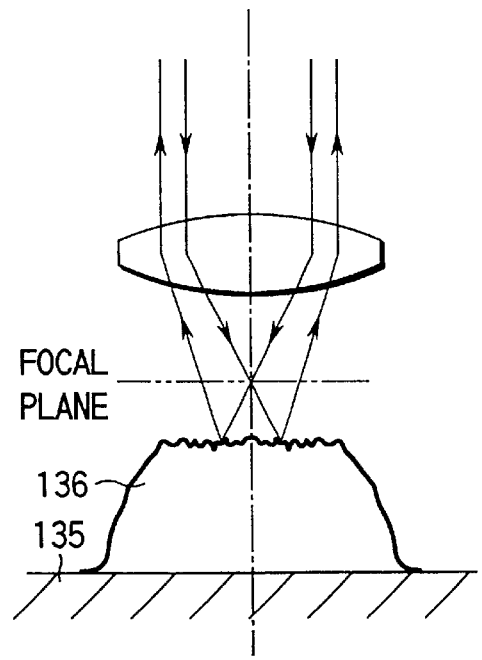
FIG. 7B is a schematic diagram showing a beam defocused.

This is why the focal plane of the objective lens 103 is set off from the top of the bump 136, making the measuring beam diverges to a certain degree in the vicinity of the top of the bump 136 as shown in FIG. 7B (defocused condition).

This control alone can achieve some effect, depending on the surface condition of the bump 136. Since the measurement is made in a defocused condition, however, the light beams returning to the detectors also diverge. Furthermore, the distribution of the light intensity may be greatly distorted in some cases. This is because the gravity center of the intensity of the light spot has deviated. Obviously, this will cause a measurement error.

In order to solve this problem, the collimator lens driving section 133 operates to move the collimator lens 105 back or forth by a predetermine distance (Step S8-5). The light beam can thereby be diverged or converged on the projection side. The measuring light diverges on the surface of the object 101, whereby the influence of the dents and projections is mitigated. Moreover, the light reflected from the surface of the object 101 becomes parallel after passing through the objective lens 103 and can be converged at most on the detectors 115 and 116. Hence, the deviation of the gravity center caused by the distribution of light in the spot of the light received is inhibited, enhancing the accuracy of measurement.

MODIFIED EMBODIMENT

In the first embodiment, the difference between the amount of light the detector 115 receives and the amount of light the detector 116 receives is detected in Step S5-2 from the ratio between the sum signals PR and PL obtained in the detectors 115 and 116, respectively. Instead, the difference may be determined from the absolute value of the difference between the sum signals.

More specifically, the height measured may be considered to be valid (that is, it may be determined that measurement is possible), only if the following holds:

$$|(PR-PL)/(PR+PL)|<0.3 \tag{12}$$

In Step S5-3, too, it is determined whether the distribution of the amount of light is appropriate or not, on the basis of the ratio between the absolute values of the spot position signals δR and δL. Instead, that may be determined from the difference between the absolute values of the spot position signals.

For instance, it may be determined that the height measured is valid (namely, it may be determined that measurement is possible), only if the following holds:

$$||\delta R|-|\delta L||<3 \mu m \tag{13}$$

The first embodiment comprises a pair of detection optical systems, each having a detector (a separator lens and a detector). However, the invention is not limited to this. For example, the apparatus may comprise a pair of such optical systems and another pair of detection optical systems arranged in the direction rotated by 90° around the optical axes of the optical systems of the first pair.

In this structure, the optical systems of the second pair can perform measurement in some cases even if the values measures by the optical systems of the first pair are discarded because the measurement possible/impossible determining section has determined that measurement is impossible. Thus, as much valid measurement results as possible can be obtained. In the case where only one pair of detection optical systems are provided, almost the same effect can be attained, though the function is limited in part.

SECOND EMBODIMENT

Figure 9:
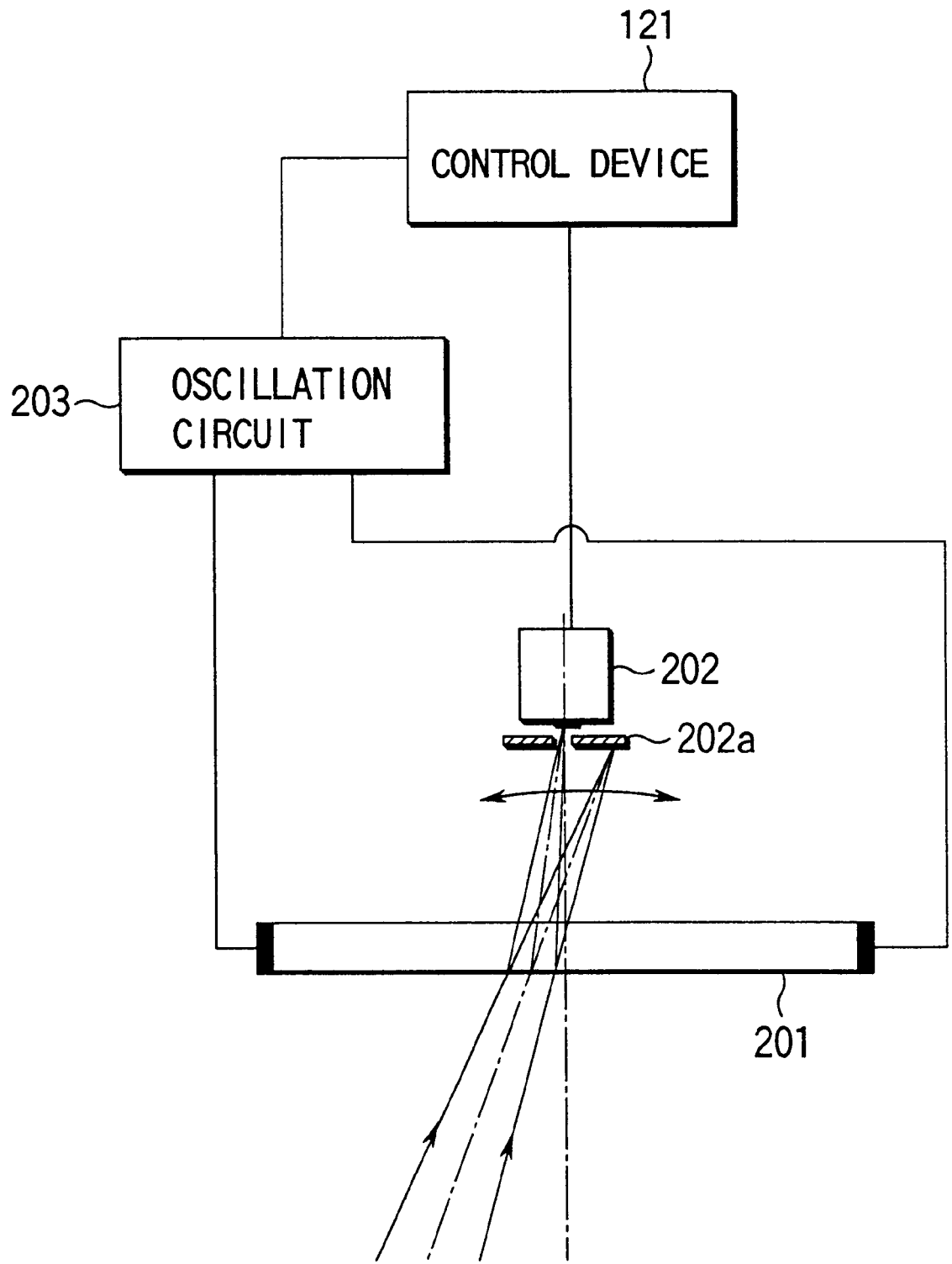
FIG. 9 is a schematic diagram showing a light-sensing optical system according to a second embodiment of the present invention.

The second embodiment of the present invention will be described, with reference to FIG. 9.

In the recent IC market, it is demanded that the inspection of ICs be accomplished at high speed. This is because the operation throughput is of vital importance.

In the first embodiment, the first and second detectors 115 and 116 provided for detecting the changes in the position of the light spot are PSDS. Their response speed is lower than the response speed of photodiodes that are designed merely to detect changes in the amount of light. The maximum speed with which the apparatus according to the first embodiment can measure height is determined by the response speed of the detectors 115 and 116 that detect the position δ of the light spot moving in accordance with the height of the object 101. Theoretically, it is therefore impossible for the apparatus to inspect Ics at a speed higher than the response speed of the detectors 115 and 116.

In view of the above, the second embodiment is basically the same as the first embodiment, but uses a detection system in place of PSDs. As shown in FIG. 9, the detection system comprises a photoacoustic element 201 shaped like a plate, a photodiode 202 provided on the back of the element 201, and a slit 202a made in the element 201.

The photoacoustic element 201 is a kind of a piezoelectric element composed of a translucent substrate and electrodes provided on both ends of the substrate. When a high-frequency voltage is applied to the ends of the element, the refractive index of the substrate periodically changes in the horizontal direction. The element therefore has a function of diffracting the incident light.

Namely, this embodiment uses the photoacoustic element 201 as a diffraction grating. When the incident light is monochromatic, the angle at which the light is diffracted can be continuously changed by varying the frequency of the voltage applied to the photoacoustic element 201. This function is utilized, causing an oscillation circuit to continuously change the frequency. Thus, the object is scanned with the diffracted light in the direction indicated by the arrow in FIG. 9.

The incidence angle of the light applied is detected from the timing at which the photodetector 202 detects the diffracted light and the relation between the diffraction angle and the frequency. Therefore, the height of the object 101 can be detected from the difference between the incidence angle at which light is applied when the height Z is zero and the incidence angle which has been detected.

Generally, the sampling frequency of a PSD is in the order of 100 Khz. By contrast, the response speed of the photodetector 202 is in the order of MHz to GHz. It follows that the speed of measuring the height can be increased in accordance with the frequency of the high-frequency voltage applied to the photoacoustic element 201.

THIRD EMBODIMENT

The third embodiment of this invention will be described, with reference to FIGS. 10 to 14.

Figure 10:
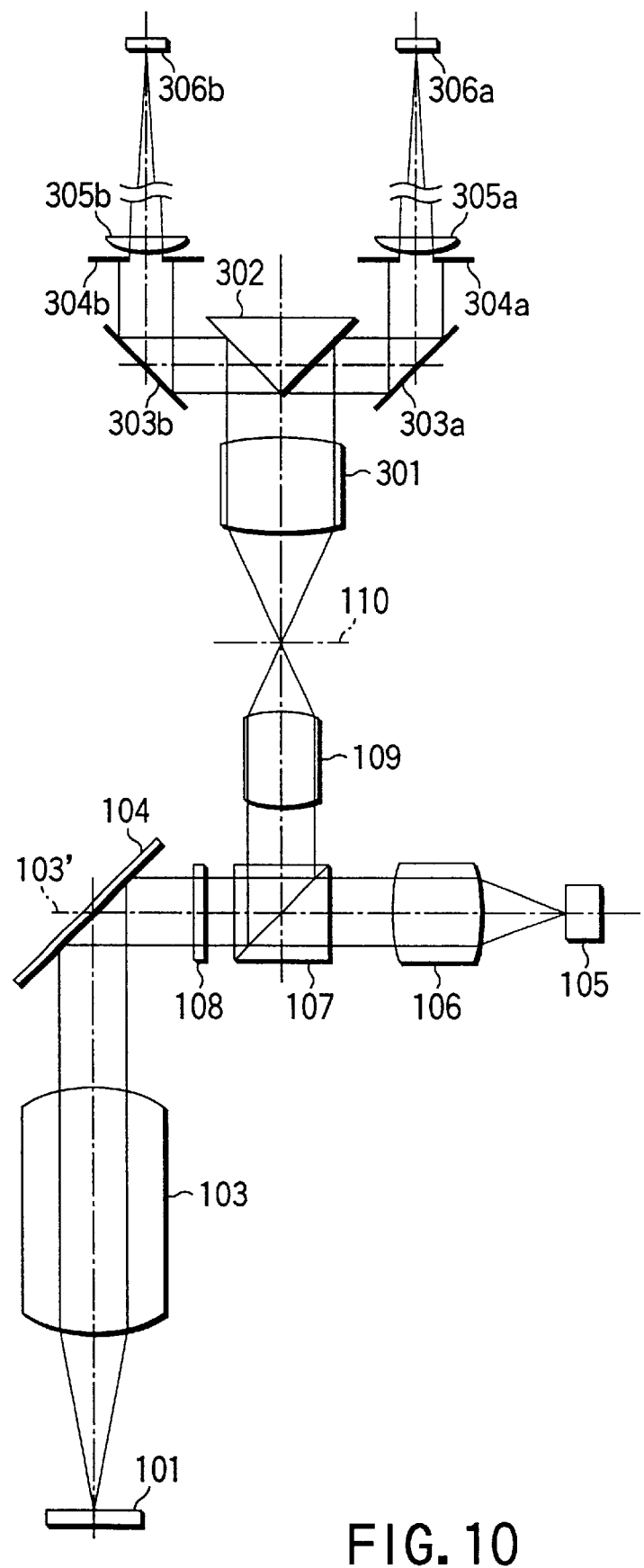
FIG. 10 is a schematic diagram illustrating a height measuring apparatus according to a third embodiment of the invention.

FIG. 10 is a schematic representation of a height measuring apparatus according to the invention. The optical system provided on the incident side of a lens 109 is identical to its counterpart of the first embodiment.

Therefore, the components of this optical system are designated at the same reference numerals and will not be described in detail.

The measuring light emitted from a laser diode 105 is applied to a collimator lens 106. The lens 106 changes the light to parallel light. The parallel light passes through a polarized beam splitter 107 and a quarter-wave plate 108. It is then reflected by a galvano-mirror 104 and focused by an objective lens 103, forming a focused light beam having an NA determined by the pupil diameter and focal length of the objective lens 103. The light beam is focused in a telecentric fashion at a given position on the surface of the object 101.

The measuring light reflected by the object 101 passes through the objective lens 103, in the direction inverse to the direction described above. After it is reflected by the galvano-mirror 104, the light passes through the quarter-wave plate 108, is reflected by the polarized beam splitter 107 and is focused on a primary image surface 110 by the first imaging lens 109.

In the present embodiment, the light beam passes through a pupil relay lens 301 after passing through the primary image surface 110. The pupil relay lens 301 functions as the second object lens designed for an infinite system. An orthogonal mirror 302 splits the light beam into two segments having a cross section that is substantially semicircular. One beam segment passes through a mirror 303a and an iris 304a. The other beam segment passes through a mirror 303b and an iris 304b. The separator lenses 305a and 305b focus the beam segments on position sensing devices (PSD) 306a and 305b, respectively.

The front focal plane of the first imaging lens 109 is located in the pupil pane 103', or conjugate plane, of the first objective lens 103. On the other hand, the separator lenses 305a and 305b are arranged in the rear focal plane of the pupil relay lens 301, i.e., the second objective lens. Hence, the separator lenses 305a and 305b exist at a position that is conjugate with the pupil plane 103' of the first objective lens 103.

Therefore, the separator lenses 305a and 305b form measuring spots on PSDs 306a and 306b, respectively, from those parts of the measuring light reflected from all measurement points which has passed through the same part of the pupil plane 103' of the objective lens 103.

As is clear from the drawing, the light reflected from all points on the object 101, which are applied as the angle of the galvano-mirror 104 is changed, are reflected again by the galvano-mirror 104. The light propagates backwards in the same optical path it has projected, always focused on the axis of the primary image surface 110. As a result, the spots on the PSDs 305a and 306b move only in accordance with the changes in the height of the object 101, in the same way as in the case of FIG. 1.

Figure 12:
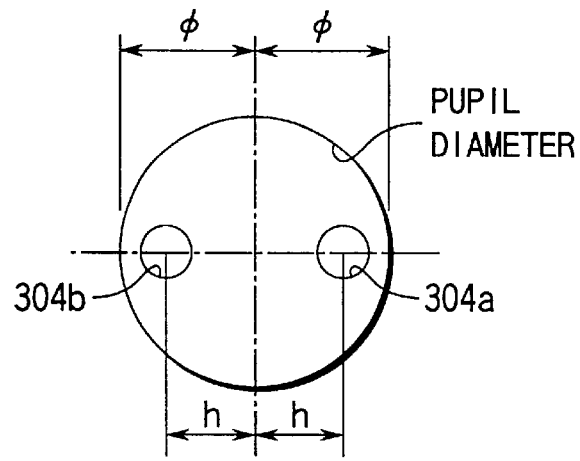
FIG. 12 is a plane view illustrating the relation between the pupil diameter of the objective lens and the diaphragm (separator lens)

Assume that iris 304a and 304b are provided at the ends of the pupil as is illustrated in FIG. 12. The spots on the PSDs 306a and 306b move in the opposite directions due to the dents and projections formed on the object 101. This accords with the well-known principal of triangulation.

Thus, the same control system as shown in FIG. 1 may be used to measure the height of the object 101 on the basis of the coordinates (x, y) of the measuring position on the object 101 and the distance δ by which the spots on the PSDs 306a and 306b deviate from the centers.

The method of calculating the height will be explained in detail, with reference to FIG. 11.

Figure 11:
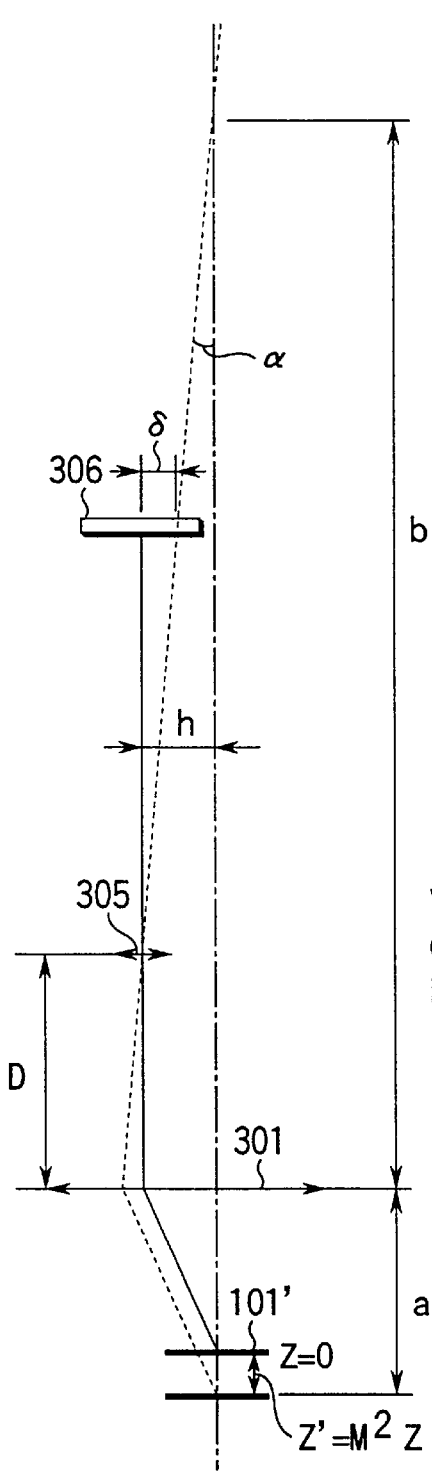
FIG. 11 is a schematic diagram for explaining the principle of triangulation.

FIG. 11 shows that section of the apparatus, which is located at the back of the primary image surface 110. Here, the image of the object, formed on the primary image surface 110, is depicted as new surface 101' of the object.

Used as the system parameters are: the focal length fp of the pupil relay lens (second objective lens) 301, the focal length fs of the separator lens 305, the magnification M of the primary image, the height h measured from the optical axis to the center of the separator lens 305, the distance D between the pupil relay lens 301 and the separator lens 305, and the numerical aperture $NA_{OB}$ of the first objective lens 103.

The defocusing amount (height) Z' of the primary image is given as $ZM^2$, where z is the height of the object. A light spot is formed on the PSD 306, at a distance δ from the center of the PSD 306. The distance δ is represented as follows, as can be understood from the drawing:

$$\delta = fs\, \tan\alpha \tag{14}$$

$$\tan\alpha = h/(b-D) \tag{15}$$

Therefore:

$$\delta = fs \cdot h/(b-D) \tag{16}$$

$$h = fp \cdot NA_{OB}/MP \tag{17}$$

where P is the ratio of the iris center calculated on the pupil of the objective lens 103 to the radius of the pupil, P=Φ/h as shown in FIG. 12.

Value b may be calculated as follows:

$$1/b - (1/fp) - (1/(fp+M^2Z)) \tag{18}$$

Hence:

$$b = fp(fp+M^2Z)/M^2Z \tag{19}$$

These equations are combined, formulating the following equation:

$$\delta = fs \frac{fp NA_{OB} M}{P} Z \frac{1}{fp(fp + M^2Z) - DM^2Z} \tag{20}$$

As mentioned above, the distance D between the separator lens 305 and the pupil relay lens 301 is fp. Therefore, the following equation holds:

$$\delta = \frac{fs}{fp} \frac{NA_{OB} M}{P} Z \tag{21}$$

Obviously, δ and Z have a completely linear relation. The value actually measured is δ. Therefore, the equation (21) is transformed to the following:

$$Z = \frac{fpP}{fs NA_{OB} M} \delta \tag{22}$$

In the present embodiment, a pair of separator lens 305a and 305b and a pair of PSDs 306a and 306b are provided, with the components of either pair located symmetrically with respect to the optical axis. This increases the height measuring sensitivity twice as much and makes it possible to detect the cause of measurement errors, such as the inclination of the surface of the object 101, as in the first embodiment.

Figure 13:
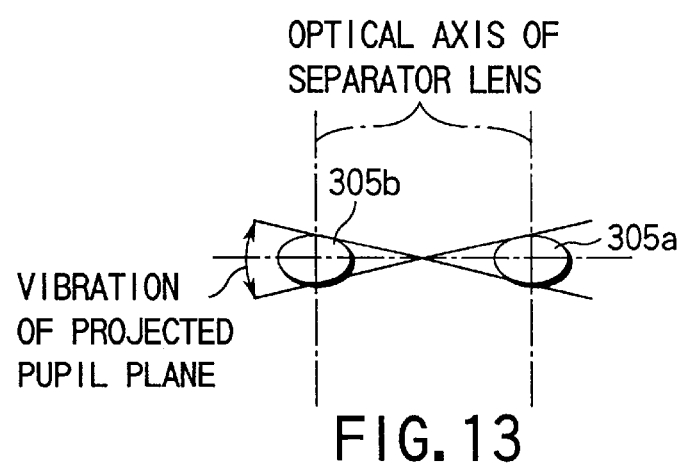
FIG. 13 is a diagram for explaining the vibration of the projected pupil plane.
Figure 14:
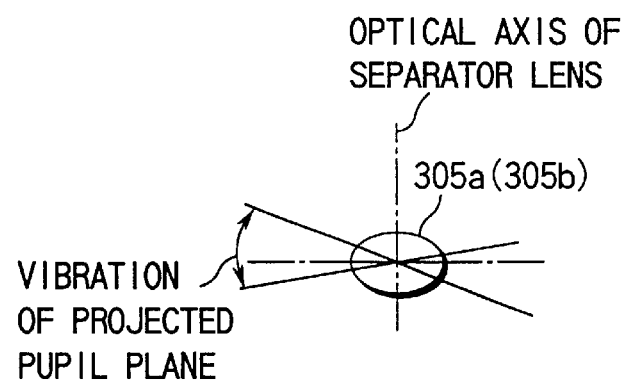
FIG. 14 is another diagram for explaining the vibration of the projected pupil plane.

In FIG. 10, the scanning direction of the measuring beam may be the same as the direction in which the separators 305a and 305b are arranged (for example, the in-surface direction of the drawing). If so, the pupil planes projected on the separator lenses 305a and 305b vibrate as the galvanomirror 105 vibrates toward and away along the optical axes of the separator lenses 305a and 305b as shown in FIG. 13. If the scanning direction of the measuring beam is perpendicular to the drawing, the pupil planes projected on the separator lenses 305a and 305b vibrates as is shown in FIG. 14.

The vibration of the pupil planes projected causes an error in the measured value. Nonetheless, its influence on the measured value is extremely small in the case of FIG. 14. This is because the vibration corresponds to the positional changes of the separator lenses 305a and 305b in the case of FIG. 13, and to the rotation of the separator lenses 305a and 305b toward the shorter sides of the lenses 305a and 305b in the case of FIG. 14. In view of this, the galvano-mirror 104 is used to scan the measuring light perpendicular to the drawing of FIG. 1 and the stage 102 is used to scan parallel to the drawing, so as to perform measurement on the entire surface of the object 101. High measurement accuracy can thereby be guaranteed for all measurement points.

In the third embodiment, the equation representing the relation between the height of the object and the position of the spot is completely linear. Arithmetic operations need not be effected to correct nonlinear terms. The measurement of height can therefore be carried out with high accuracy and at high speed.

FOURTH EMBODIMENT

Figure 15:
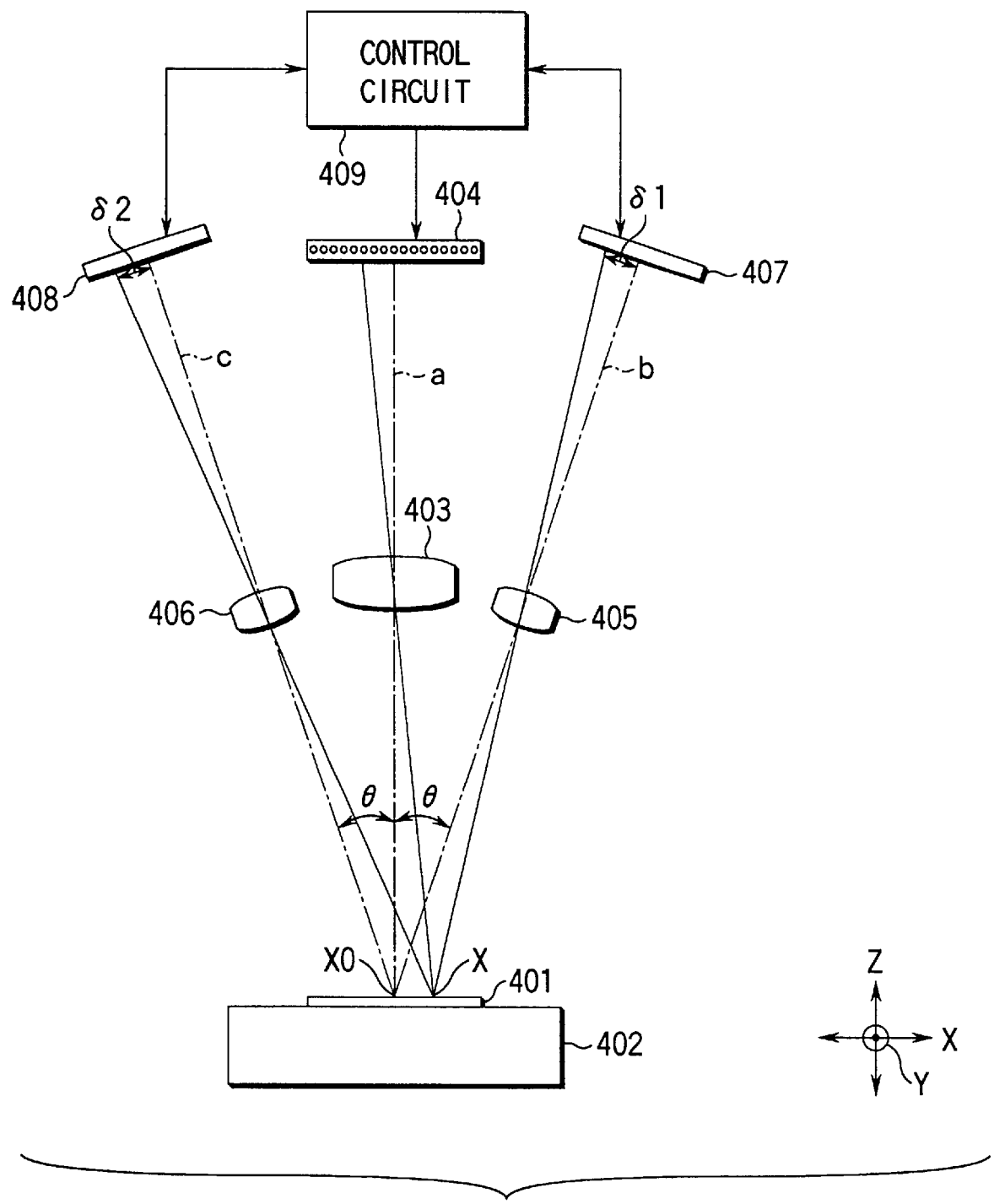
FIG. 15 is a schematic diagram showing a height measuring apparatus according to a fourth embodiment of the present invention.

FIG. 15 is a schematic representation of a height measuring apparatus according to the fourth embodiment of the invention.

In the figure, the numeral 401 denotes an object. The object 401 is placed on a stage 402. In this case, the stage 402 can be moved in at least the Y-axis direction (i.e., the direction perpendicular to the drawing).

A light source array 404 is arranged in a first optical axis a which is perpendicular to the object 401 placed on the stage 402. An index light-source projecting lens 403 provided between the array 404 and the object 401. The index light-source projecting lens 403 is provided to project the light source array 404 on the object 401 placed on the stage 402. The lens 403 is a telecentric lens, therefor all axial rays of each light sources, passing through the lens, are impinged perpendicular to the object 401. The light source array 404 has a plurality of tiny light sources, e.g., LEDs, arranged in a straight line extending along the X-axis direction that intersects at right angle with the direction (i.e., the Y-axis direction) in which the stage 402 can move. The LEDs are turned on sequentially.

The light source array 404 and the index light-source projecting lens 403 are used for the following reason. If ordinary illumination is employed, it will be extremely difficult or impossible to identify a point to be measured, from the real image which CCD line sensors 407 and 408, described later, detect, depending upon the height and structure of the object 401.

First and second CCD line sensors 407 and 408 are provided, respectively, in the second and third optical axes b and c inclining to the right and left by the same angle θ with respect to the optical axis a which is perpendicular to the stage 402. First objective lens 405 is located on the second axis b and between the stage 402 and the first CCD line sensor 407. Similarly, second objective lens 406 is located on the third axis c and between the stage 402 and the second CCD line sensor 408. In this case, the objective lenses 405 and 406 have the same optical characteristics. They are located at the same distance from a point x0 on the surface of the object 401, where the optical axes a, b and c intersect. The CCD line sensor 407 is located at the position where the objective lens 405 forms an image of point x0. The CCD line sensor 408 is located at the position where the objective lens 406 forms an image of point x0.

The CCD line sensors 407 and 408 are connected to a control circuit 409. The control circuit 409 controls the LEDs of the light source array 404. It also receives the outputs from the CCD line sensors 407 and 408 and detects the level of the surface of the object 401.

In operation, the nth LED of the light source array 404 (i.e., an LED set off from the optical axis a) is turned on under the control of the circuit 409. This tiny light source is projected through the index light-source projection lens 403, at point x on the object 401, which is spaced at a predetermined distance from the point x0 in the optical axis a. The light reflected from the point x on the object 401 passes through the objective lens 405 provided in the optical axis b and is focused on the CCD line sensor 407. At the same time, the light passes through the objective lens 406 provided in the optical axis c and is focused on the CCD line sensor 408. In this case, the image of the point x is formed on the CCD line sensor 407 deviates from the optical axis b by a distance δ1. And the image of the point x is formed on the CCD line sensor 408 deviates from the optical axis c by a distance δ2. Distances δ1 and δ2 change in the opposite directions as the measurement point x moves in the z direction.

The outputs from the CCD line sensors 407 and 408 are input to the control circuit 409. The control circuit 409 calculates the height z from the reference plane for the point x on the object 401, from the serial number n of the LED of the light source array 404 and the imaging positions δ1 and δ2.

Then, the other LEDs of the light source array 404 are turned on, one after another. The outputs the CCD line sensors 407 and 408 generate are input to the control circuit 409. Heights z for one line on the object 401, which corresponds to the light source array 404, are thereby measured sequentially and continuously. When these height z for one line are all calculated, the stage 402 is scanned in the Y-axis direction for a distance as needed in accordance with the positional resolution of the stage 402. (The stage 402 is so scanned when the outputs for one line are input, if the image memory, not shown, has a sufficient storage capacity.) Then, height measurement is effected for the next line, thereby measuring height z on a prescribed area on the object 401.

How the control circuit 409 calculates height z on the object 401 will be explained in greater detail.

Figure 16:
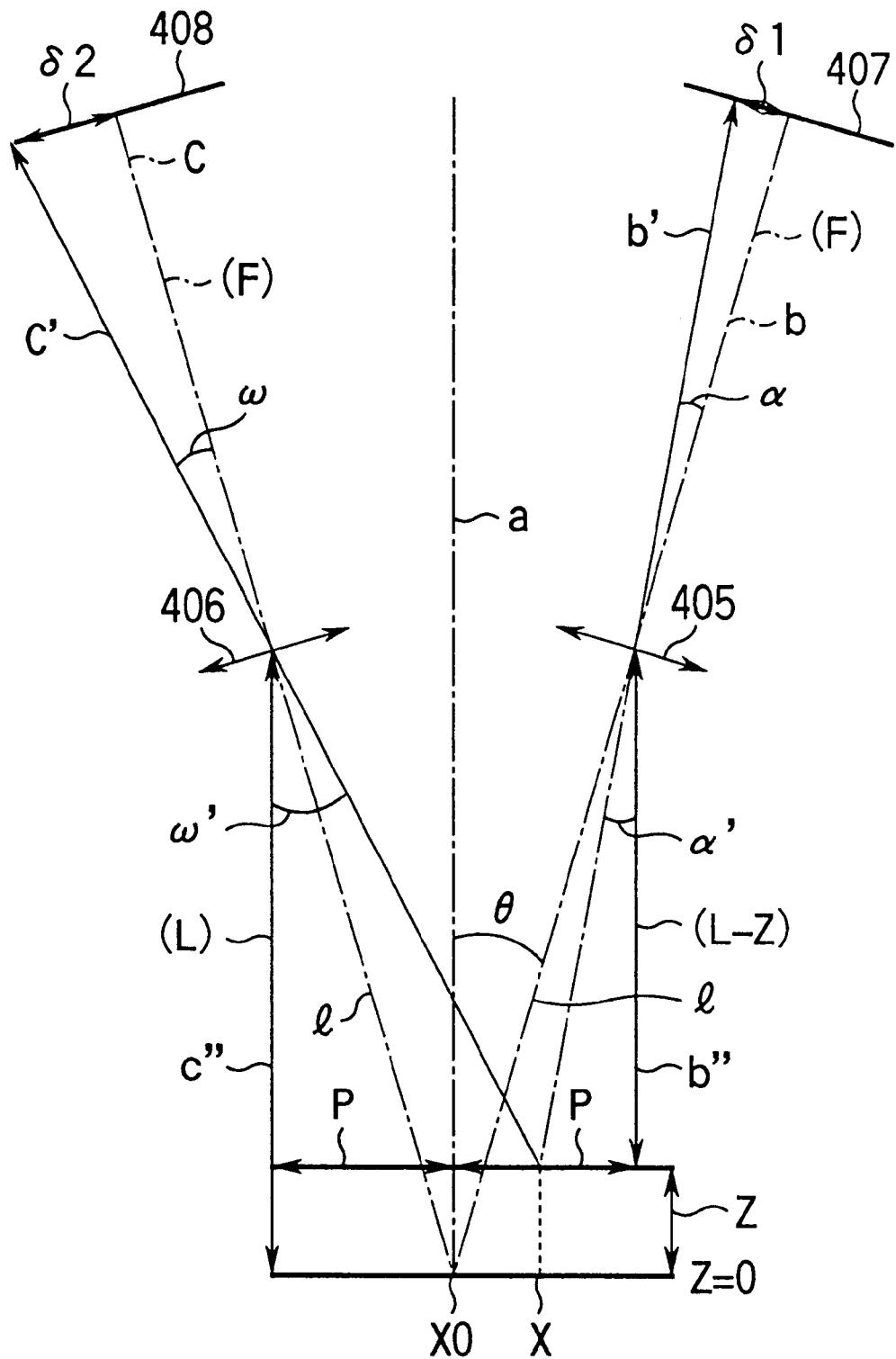
FIG. 16 is a schematic diagram for explaining the principle of triangulation.

FIG. 16 is a diagram explaining the principle of measuring the height. The components identical to those shown in FIG. 15 are designated at the same reference numerals. In this case, the system parameters applied are: the focal length f of the objective lenses 405 and 406, the imaging magnification β, the angle θ at which the optical axes b and c incline to the optical axis a.

The height z on the object 401 may be obtained as a function of the imaging positions δ1 and δ2 and the point x, all on the CCD line sensors 407 and 408, as in most cases. For simplicity of explanation, however, the difference between the imaging positions δ1 and δ2, δ1−δ2, is represented as a function of z and x.

In this case, the length l of the optical axes b and c, from the pupil planes of the objective lenses 405 and 406 to the point on the surface of the object 401, where z=0, is given as l=f(β+l)/β. And the length F of the optical axes b and c, from the pupil planes of the objective lenses 405 and 406 to the surfaces of the CCD line sensors 407 and 408 is given as F1=β1=f(β+1).

Then, the imaging positions δ1 and δ2 are represented as follows:

$$\delta1 = F \tan\alpha, \quad \delta2 = F \tan\omega \tag{23}$$

where α is the angle between the optical axis b and the axis b' of the light reflected from the object 401 and reaching the imaging positions δ1 of the CCD line sensor 407, and ω is the angle between the optical axis c and the axis c' of the light reflected from the object 401 and reaching the imaging positions δ2 of the CCD line sensor 408.

The angles α and ω are expressed as follows:

$$\alpha = \theta - \alpha', \quad \omega = \omega' - \theta \tag{24}$$

where α' is the angle between the optical axis b' and a perpendicular b" extending to the surface of the object 401 from the center of the pupil plane of the objective lens 405, and ω' is the angle between the optical axis c' and a perpendicular c" extending to the surface of the object 401 from the center of the pupil plane of the objective lens 406.

Further, the angles α' and ω' are given as follows:

$$\alpha' = \tan^{-1}((P-x)/(L-z)) \tag{25}$$

$$\omega' = \tan^{-1}((P+x)/(L-z)) \tag{26}$$

$$L = 1\cos\theta, \quad P = 1\sin\theta \tag{27}$$

where x is the distance between the point x0 in the optical axis a, z is defocusing amount, L is the length of a perpendicular c" extending between the center of the pupil plane of the object lens 406 and the point on the object 401, where z=0, and P is the distance between the optical axis a and the point where the perpendicular c" intersects with the surface of the object 401.

The equations (23) to (27) are combined into the following:

$$\delta1 - \delta2 = F \frac{2P(L-z)(\tan^2\theta - 1) + 2\{(L-z)^2 - (P^2 - x^2)\}\tan\theta}{(L-z)^2 + 2P(L-z)\tan\theta + (P^2 - x^2)\tan^2\theta} \tag{28}$$

The equation (28) shows that how the values δ1 and δ2 are represented with respect to the height z when the point spaced from the point x0 by distance x undergoes z motion in the direction of height.

Figure 17:
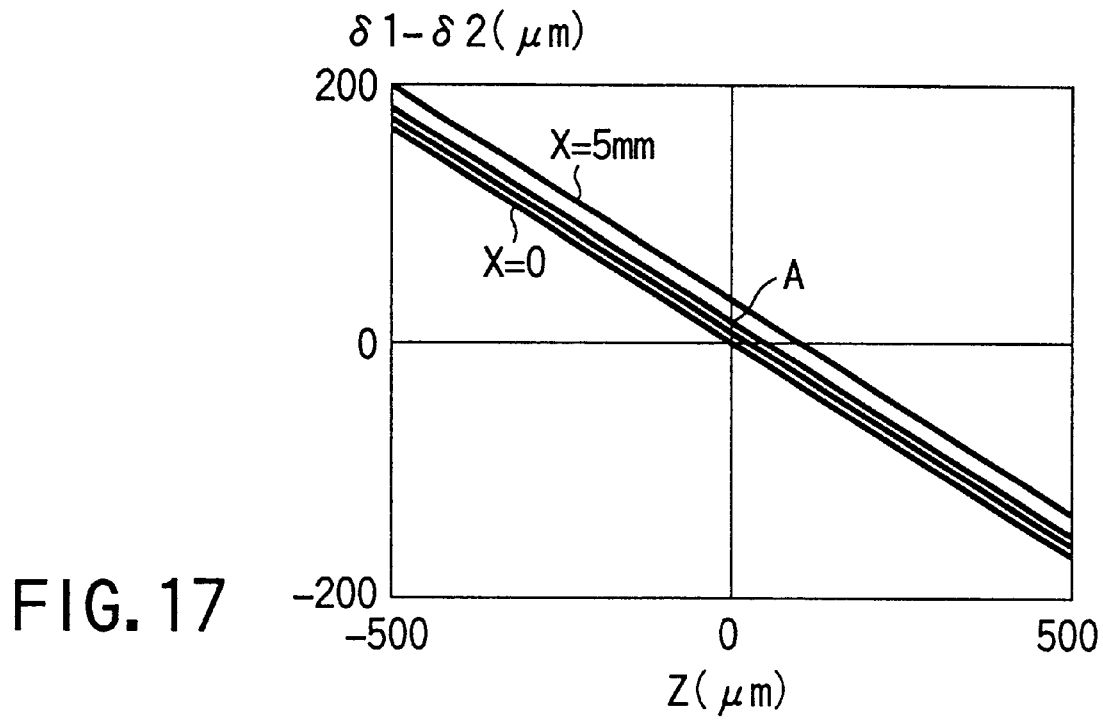
FIG. 17 is a graph explaining the principle of triangulation.
Figure 18:
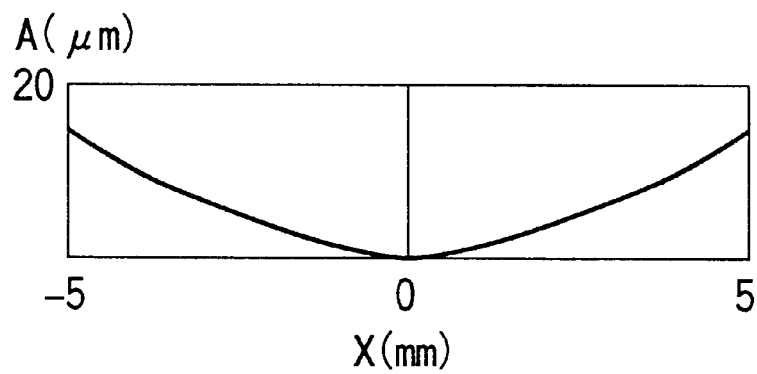
FIG. 18 is another graph explaining the principle of triangulation.

The calculation of numerical values, based on the equation (28), simplifies the relation between δ1−δ2 and z, whereby the results shown in FIGS. 17 and 18 are obtained. The system parameters used here are: f=300 mm, β=1, and θ=40°.

FIG. 17 illustrates the relation between δ1−δ2 and z resulting from the calculation of numerical values, based on the equation (28). The relation between δ1−δ2 and z obtained in this case is almost linear. The line representing the relation passes point 0 when x=0 and moves in parallel in the δ1−δ2 axis as the value for x changes. Thus, δ1−δ2 can be expressed by a linear equation consisting of a proportion term and an offset term which are separated for variables. Namely:

$$\delta1 - \delta2 = kz + A(x) \tag{29}$$

The equation (28) can be approximated to the equation (29), because z and x are much smaller than the length l of the optical axis.

In the equation (29), k is the slope that is obtained when the result obtained from the equation (28), where x=0, is subjected to linear approximation. The offset term A(x) is a value for δ1−δ2, obtained when x is changed while z=0. This term is as is shown in FIG. 18.

Figure 19:
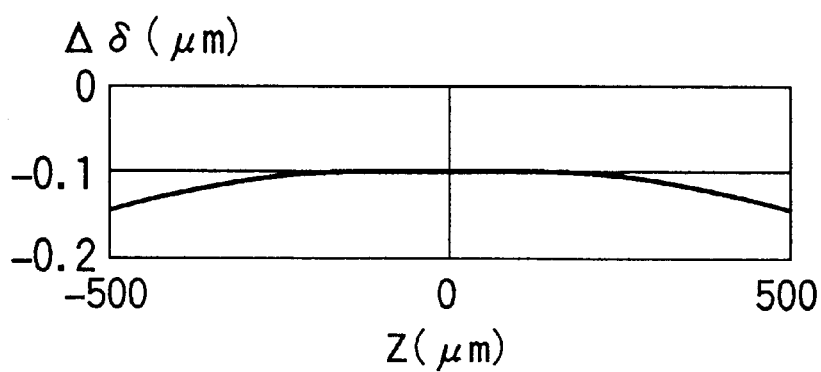
FIG. 19 is still another graph explaining the principle of triangulation.

FIG. 19 shows how the difference between the value δ1−δ2 calculated on the basis of the equation (28) and the value δ1−δ2 calculated on the basis of the equation (29) does change as x is changed stepwise from 0 to 5 mm. From FIG. 19 it is seen that the equation (29) is an approximation formula which is scarcely influenced by the value x.

In the case where f=300 mm, β=1, and θ=40° as mentioned above, the difference Δδ between the value δ1−δ2 calculated on the basis of the equation (28) and the value δ1−δ2 calculated on the basis of the equation (29) is −0.15 μm when z=±500 μm. The nonlinear relative error is −0.03%, almost regardless of the value x.

Since the value z is obtained from δ and x, the equation (28) can transform to the following:

$$z = \{(\delta1 - \delta2) - A(x)\}/k \tag{30}$$

Hence, the nonlinear relative error of δ1−δ2 with respect to the value z is +0.03/0.347=0.086%. A relative error of such a value does not affect the accuracy desired in practice.

In the control circuit 409, the proportion term 1/k and the offset term A(x) are determined by performing simulation on the basis of the equation (28), once a focal length f of the objective lenses 405 and 406, the imaging magnification β and the angle θ at which the optical axes b and c incline to the optical axis a have been set. Then, the control circuit 409 can calculate the height z of the object 401 with an adequate accuracy, over a broad range (namely, ±5 mm or more in the x direction, and ±0.5 mm or more in the z direction).

Accurate measurement can be accomplished by the use of the offset term A(x) in the equation (30). This is because the index light-source projecting lens 403 shown in FIG. 15 is a telecentric lens and the position x projected on the object 401 by the light source array 404 remains unchanged, irrespective of the height z of the object 401.

The index light-source projecting lens 403 and the light-source array 404 having a plurality of tiny light sources are arranged with respect to the object 401 placed on the stage 402 that can move in the Y-axis direction. The objective lens 405 and the CCD line sensor 407 are provided in the optical axis b inclined, in the surface of the drawing, by the angle θ to the right with respect to the optical axis a perpendicular to the object 401. And the objective lens 406 and the CCD line sensor 408 are provided in the optical axis c inclined, in the surface of the drawing, by the angle θ to the left with respect to the optical axis a. The nth tiny light source of the light source array 404 is projected through the index light-source projecting lens 403 on the object 401, at the position x spaced by the predetermined distance from the optical axis a. The light reflected from the position x is focused by the objective lenses 405 and 406 on the CCD line sensors 407 and 408, at positions δ1 and δ2 with respect to the optical axes b and c. The height z from the reference plane for the point x on the object 401 is calculated from the serial number n of the tiny light source and the imaging positions δ1 and δ2, on the basis of the linear approximation equation (30). The sequence of operations, described here, is repeated by turning on all tiny light sources one after another, whereby the height measurement can be performed on the object 401, continuously for one line corresponding to the light source array 404. Further, at the time the height z for one line is completed, the stage 402 is scanned in the Y direction for a distance as needed in accordance with the positional resolution of the stage 402. (The stage 402 is so scanned when the outputs for one line are input, if the image memory, not shown, has a sufficient storage capacity.) Then, height measurement is effected for the next line, thereby continuously measuring height z on a prescribed area on the object 401. Height measurement can thus be effected more efficiently than is possible with the conventional apparatus in which the stage is scanned every time height is measured at one point and then is moved to the next measurement point. The present embodiment can, therefore, measure height at many measurement points of an object such as a recently developed electronic component, which has many elements, arranged in a high density and which tends to be larger, with high accuracy within a short time. The embodiment can, therefore, lessen the burden on the operator and can achieve high operating efficiency.

In the embodiment described above, the light source array 404 is one comprising a plurality of tiny LEDs arranged in a straight line. However, various devices may replace the array 404. For example, it may be replaced by a device having a plurality of pinholes arranged in a straight line and a light source for applying light via the pinholes from the back. Alternatively, a device having a plurality of optical fibers with their ends arranged in a straight line may replace the array 404. Further, the array 404 may be replaced by a device having a galvano-mirror for deflecting a laser beam, thus scanning an object in the X-axis direction, as in the known scanning electron microscope. Moreover, the CCD arrays, or detection elements, may be replaced by position sensors (PSDs) which perform the same function.

FIFTH EMBODIMENT

Figure 20:
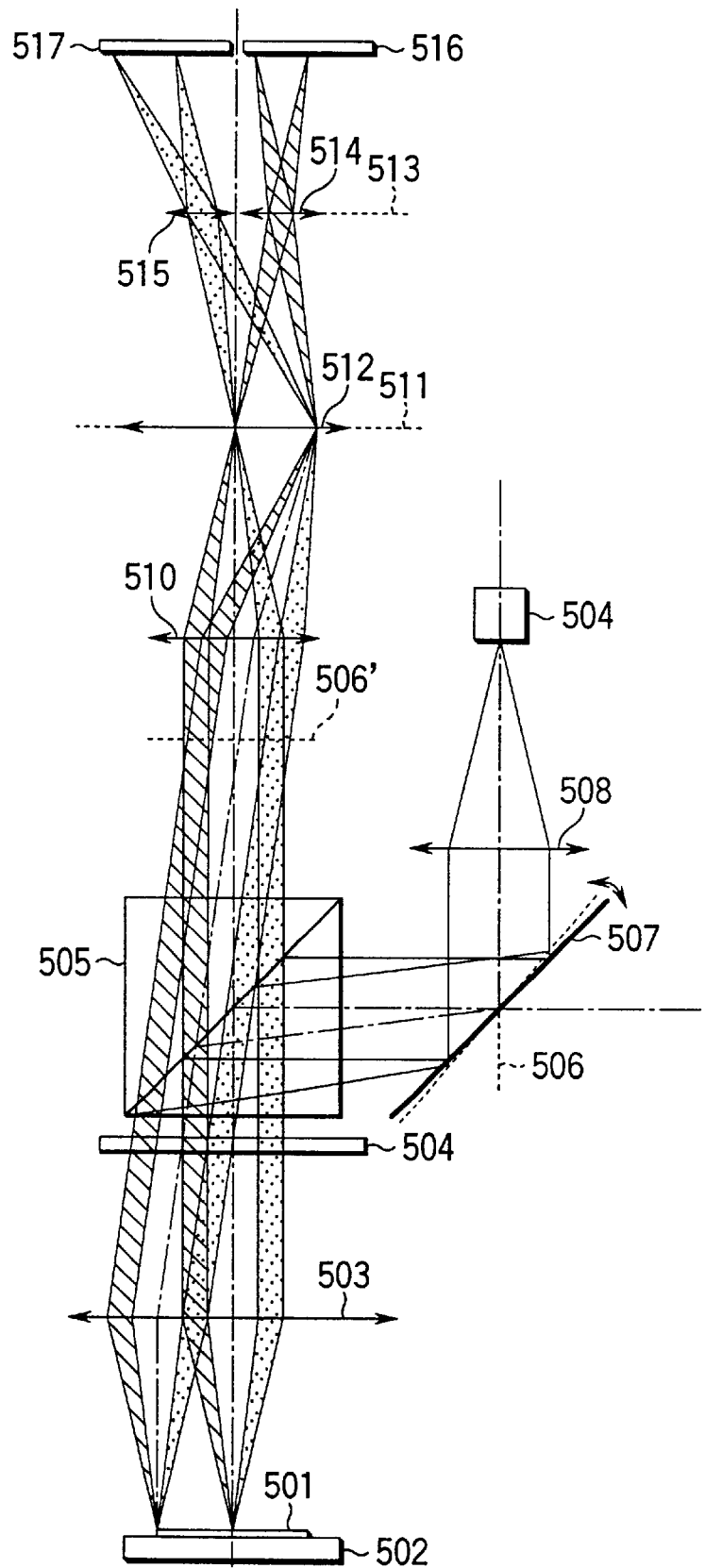
FIG. 20 is a schematic diagram showing a height measuring apparatus according to a fifth embodiment of the present invention.

FIG. 20 shows a height measuring apparatus according to the fifth embodiment of the present invention.

In this figure, the reference numeral 501 denotes an object. The object 501 is placed on a stage 502. In this case, the stage 502 can be moved in at least the Y-axis direction (i.e., the direction perpendicular to the drawing).

An objective lens 503 is provided, opposing the object 501 placed on the stage 502. The objective lens 503 is a telecentric lens of infinity design, which is provided on the object side.

A quarter-wave plate 504 and a polarized beam splitter 505 are arranged at the back of the back of the objective lens 503 and in front of the pupil plane thereof. They divide the pupil plane of the objective lens 503 into two planes 506 and 506'.

A galvano-mirror 507 is arranged in one of the pupil planes, i.e., pupil plane 506. The galvano-mirror 507 can rotate around the center of the pupil plane 506. When the galvano-mirror 507 rotates, it scans the surface of the object 501 with measuring light, which will be described later. In this case, the direction in the scanning the measuring light is the same as the direction in which separator lenses 514 and 515, described later, are arranged.

A laser diode 509 is provided, opposing the galvano-mirror 507, and a collimator lens 508 is located between the galvano-mirror 507 and the laser diode 509.

An imaging lens 510 is arranged at the back of the pupil plane 506' of the objective lens 503. A field lens 512 is provided near the image surface 511 of the imaging lens 510. The field lens 512 functions as a pupil-projecting lens combined with the imaging lens 510. The lens 512 is designed to project the pupil plane 506' to a pupil projection plane 513.

The separator lenses 514 and 515 are arranged in the pupil projection plane 513, symmetric to each other with respect to an optical axis. The separator lenses 514 and 515 form spots on detectors 516 and 517. The separator lenses 514 and 515 are provided to focus the measuring light beams passing through different parts of the pupil of the objective lens 503, at different points. They have the same optical characteristics.

In this structure, the collimator lens 508 converts the laser beam emitted from the laser diode 509 to a parallel beam. The parallel beam is reflected by the galvano-mirror 507 and further by the polarized beam splitter 505. The beam then passes through the quarter-wave plate 504, is applied as a converging beam having an NA determined by the pupil diameter and focal length of the objective lens 503, and is focused telecentrically at a given position on the surface of the object 501. As the galvano-mirror 507 is rotated in this condition, the measuring light line-scans the surface of the object 501 in the X direction, in accordance with the angle through which the galvano-mirror is rotated.

On the other hand, the light reflected from the surface of the object 501 passes through the objective lens 503, quarter-wave plate 504 and polarized beam splitter 505. The imaging lens 510 focuses the light on the image surface 511. The light passes through the separator lenses 514 and 515 and are applied to the detectors 516 and 517, forming spots thereon.

The separator lenses 514 and 515 are arranged in the pupil projection plane 513 on which the field lens 512 and imaging lens 510 have projected the pupil plane 506' of the objective lens 503. The light beams passing through the same part of the pupil plane 506' can therefore form light spots on the detectors 516 and 517, respectively. As a result, the spots formed on the detectors 516 and 517 due to the dents and projections on the surface of the object 501 move in the opposite directions in accordance with the principle of triangulation, as in the fourth embodiment.

A control circuit, not shown, detects the dents and projections on the surface of the object 501, from the coordinates of a measurement point x on the image surface 511 and the distances δ1 and δ2 by which the spots on the detectors 516 and 517 deviate from the centers. The image surface 511 is a plane in which the imaging lens 510 focuses light in accordance with the rotation angle of the galvano-mirror 507. (The coordinates of a measurement point x are those of −x on the surface of the object 501 if the imaging system has a magnification of 1.)

When the galvano-mirror 507 finishes one-line scanning in the X direction by using the measuring light, the dents and projections in the one line are detected. Then, the stage 502 is moved in the Y direction for a predetermined pitch, whereby the next line is scanned. Similar operation is repeated, thereby performing height measurement on the entire surface of the object 501.

The calculation for accomplishing the height measurement on the surface of the object 501 is exactly the same as in the fourth embodiment. That is, the image surface 511 on which the image of the object 501 is projected is regarded as a new object surface, and the part above the image surface is extracted. Thus, the concept identical to the one shown in FIG. 16 that explains the principle of the measurement performed in the fourth embodiment. The same advantage as described above can therefore be expected. The concept can be applied also to objects, each having more reflection characteristics.

In the fifth embodiment, the height of the object 501 is, of course, $1/m^2$ of the image 511 directly measured, where m is the magnification of the imaging lens 510.

INDUSTRIAL APPLICABILITY

As has been described, the present invention relates to a height measuring apparatus for use in measuring the height of a small object such as a read frame or a ball grid array (BGA). The apparatus can measure height at many measurement points of an object such as a recently developed electronic component which has many elements arranged in a high density and which tends to be larger, with high accuracy within a short time. In addition, the apparatus can output only measurement results that have high reliability.

What is claimed is:

1. A height measuring apparatus comprising:
    an illumination optical system having an objective lens for focusing measuring light on a surface of an object;
    two-dimensional scanning means for scanning the object in two directions, with the measuring light;
    a pupil relay lens system for projecting a pupil plane of the objective lens to a pupil projection plane;
    an imaging optical system provided in the pupil projection plane having an optical axis spaced by a predetermined distance from an optical axis of the pupil projection plane and configured to converge some of light beams reflected from the object;
    an optical position-detecting device arranged in a focusing plane of the imaging optical system, for detecting a distance of a light spot that has moved in accordance with a height of the object; and
    a height calculator for calculating the height of the object from position data supplied from the optical position-detecting device.

2. A height measuring apparatus according to claim 1, wherein the two-dimensional scanning means is provided in the pupil plane on or near the conjugate pupil plane of the objective lens, for scanning the object in two directions, with the measuring light.

3. A height measuring apparatus according to claim 2, wherein the two-dimensional scanning means is a scanning mirror for scanning the object in an X direction and a Y direction, with the measuring light.

4. A height measuring apparatus according to claim 1, wherein the two-dimensional scanning means comprises:
    a scanning mirror provided in the pupil plane or conjugate plane of the objective lens, for scanning the object in one direction, with the measuring light; and
    a stage for moving the object in a line extending intersecting with the direction in which the scanning mirror scans the object.

5. A height measuring apparatus according to claim 4, wherein the imaging optical system is a pair of separator lenses positioned symmetrically with respect to the axis of the pupil projection plane and arranged on a line perpendicular to a direction in which the scanning mirror scans the object.

6. A height measuring apparatus according to claim 1, wherein the imaging optical system comprises:
    an optical-path branching optical system for separating a light beam reflected by the object, from the measuring light applied to the object; and
    an off-axis imaging lens spaced from an optical axis of the pupil projection plane, for converging, on the optical position detecting device, some of the light beams emitted from the pupil relay lens system, which have passed through a part of the pupil of the objective lens.

7. A height measuring apparatus according to claim 6, wherein the two-dimensional scanning means is arranged between the optical-path branching optical system and the objective lens.

8. A height measuring apparatus according to claim 1, wherein the pupil relay lens system projects a pupil plane of the objective lens to a pupil projection plane via a scanning mirror incorporated in the two-dimensional scanning means, and wherein the imaging optical system is an off-axis imaging lens arranged on the pupil projection plane, for converging some of the light beams emitted from the pupil relay lens system, which have passed through a part of the pupil of the objective lens.

9. A height measuring apparatus according to claim 1, wherein the imaging optical system, comprises:
    a focusing lens for projecting the pupil plane of the objective lens; and
    a pair of off-axis imaging lenses arranged on the pupil projection plane of the pupil relay lens system and each having an optical axis spaced by a predetermined distance from an octal axis of the pupil protection plane, and
    wherein the pupil relay lens system is arranged near an imaging plane of the focusing lens.

10. A height measuring apparatus according to claim 1, wherein the objective lens is a telecentric lens of infinity design which is provided on the object, and the imaging optical system comprises:
    an imaging lens arranged on an infinite optical path of the objective lens, for converging a light beam, on an intermediate image surface;
    an second objective lens of infinity design for imaging again the image of the object formed near the intermediate image; and
    an off-axis imaging lens arranged in a back focal plane of the second objective lens of infinity design and having an optical axis spaced by a predetermined distance from an optical axis of the infinite optical path of the second objective lens.

11. A height measuring apparatus according to claim 1, wherein the imaging optical system comprises an optical-path branching optical system for separating a light beam reflected by the object, from the measuring light applied to the object, and the two-dimensional scanning means is arranged between the optical-path branching optical system and the objective lens.

12. A height measuring apparatus according to claim 1, wherein the imaging optical system is an off-axis imaging lens arranged on a pupil projection plane projected by the pupil relay lens system, for converging some of light beams that have axes spaced from the optical axis of the pupil plane of the objective lens,
    the pupil relay lens system projects a light beam reflected by an object, to a position that is conjugate to the pupil projection plane of the objective lens, and
    the height calculator calculates a height z by using the off-axis imaging lens on the basis of the following equation:

$$z = \frac{F(L\tan\theta - P) - \delta(P\tan\theta + L)}{F\tan\theta - \delta}$$

where $\delta$ is a position of a spot of a light beam focused on the optical position-detecting device, f is a focal length of the off-axis imaging lens, $\beta$ is an imaging magnification, $\theta$ is an angle at which the optical axis of the imaging lens inclines to a center optical axis, F is a length of an optical axis between the off-axis imaging lens and the optical position detecting device where F=f(β+1), L is a level measured from a pupil center of the off-axis imaging lens to the surface of the object, and P is a distance between the center optical axis and the pupil center of the off-axis imaging lens.

13. A height measuring apparatus according to claim 1, wherein the imaging optical system is an off-axis imaging lens arranged on a pupil projection plane projected by the pupil relay lens system, for converging light beams that have axes spaced by a predetermined distance from the optical axis of the pupil projection plane of the objective lens,
the pupil relay lens system projects a light beam reflected by object, to a position that is conjugate to the pupil plane of the objective lens,
the two-dimensional scanning means is provided near the pupil plane or conjugate plane of the objective lens,
the off-axis imaging lens and the optical position detecting device are arranged symmetrical to each other with respect to the optical axis of the light beam reflected by the object, and
the height calculator calculates a height z by using the off-axis imaging lens on the basis of the following equation, $$z = \frac{2F(L\tan\theta - P) - (\delta 1 - \delta 2)(P\tan\theta + L)}{2F\tan\theta - (\delta 1 - \delta 2)}$$

where δ1 and δ2 are positions of spots of light beams focused on the optical position-detecting device, f is a focal length of the off-axis imaging lens, β is an imaging magnification, A is an angle at which the optical axis of the imaging lens inclines to a center optical axis, F is a length of an optical axis between the off-axis imaging lens and the optical position detecting device where F=f(β+1), L is a level measured from a pupil center of the off-axis imaging lens to the surface of the object, and P is a distance between the center optical axis and the pupil center of the off-axis imaging lens.

14. A height measuring apparatus according to claim 1, wherein the imaging optical system is an off-axis imaging lens arranged on a pupil projection plane projected by the pupil relay lens system, for converging some of light beams that have axes spaced by a predetermined distance from the optical axis of the pupil projection plane of the objective lens,
the pupil relay lens system projects a light beam reflected by an object, to a position that is conjugate to the pupil plane of the objective lens, and
the off-axis imaging lens and the optical position detecting device are arranged symmetrical to each other with respect to the optical axis of all light beams reflected by the object.

15. A height measuring apparatus according to claim 1, which further comprises an optical-path branching optical system for separating a light beam reflected by the object, from the measuring light applied to the object, and in which:
the two-dimensional scanning means is a scanning mirror arranged between the optical-path branching optical system and the objective lens and in the pupil plane or conjugate plane of the objective lens; and
the imaging optical system is an off-axis imaging lens for converging some of the light beams emitted from the optical-path branching optical system, which have passed through a part of the pupil of the objective lens, said off-axis imaging lens having been arranged in the pupil projection plane projected by the pupil relay lens system, located away from the optical axis of the pupil projection plane and arranged also in a back focal plane of the second objective lens of infinity design, and
the pupil relay lens system comprises:
an imaging lens for converging, on an intermediate image surface, a light beam reflected from the object and branched by the optical-path branching optical system; and a second objective lens of infinity design for imaging again the image of the object formed near the intermediate image, and
the height calculator calculates a height Z on the basis of the following equation:

$$Z = \frac{fpP}{fsNA_{OB}M}\delta$$

where δ is a position of a spot of a light beam focused on the optical position-detecting device, fp is a focal length of a pupil relay lens, M is an imaging magnification at the intermediate image surface, $NA_{OB}$ is a numerical aperture of the objective lens of the illumination optical system, and P is a ratio of the pupil diameter of this objective lens to a distance between the optical axis of all light beams.

16. A height measuring apparatus according to claim 1, in which the optical position-detecting device comprises a pair of optical detecting elements, and which further comprises measurement possible/impossible determining means for determining whether it is possible to perform height measurement, on the basis of a light-intensity signal supplied from the optical detecting elements.

17. A height measuring apparatus according to claim 16, wherein the measurement possible/impossible determining means includes means for determining that measurement can be made, when the intensity of light detected by any one of the optical detecting elements is equal to or less than a predetermined value.

18. A height measuring apparatus according to claim 16, wherein the measurement possible/impossible determining means includes means for comparing the intensities of light detected by the optical detecting elements and for determining that measurement cannot be made, when the intensities of light compared differ by a predetermined value or a greater value.

19. A height measuring apparatus according to claim 16, wherein the measurement possible/impossible determining means includes means for comparing the positions of spots detected by the optical detecting elements and for determining that measurement cannot be made, when the positions of the spots compared differ by a predetermined value or a greater value.

20. A height measuring apparatus according to claim 16, wherein the measurement possible/impossible determining means includes means for discarding one of the heights measured by the height measuring means, which pertains to a measurement position at which height measurement cannot be made, and for outputting only any other height measured by the height measuring means.

21. A height measuring apparatus according to claim 20, further comprising a focusing-direction drive mechanism which moves the imaging optical system and the object relative to each other, thereby to control focusing/defocusing of illumination light at a surface of the object,
wherein when the object has a rough surface, the height calculator controls the focusing-direction drive mechanism such that defocusing occurs to a prescribed degree on the surface of the object.

22. A height measuring apparatus according to claim 20, characterized in that the illumination optical system further has a collimator lens for converting the illumination light beam from the light source, to a parallel light, and a collimator lens driver for driving the collimator lens in an optical axis, and the height calculator controls the collimator lens driver in accordance with a surface roughness of the object, thereby to change a collimating state of the illumination light.

23. A height measuring apparatus according to claim 1, which further comprises a focusing-direction drive mechanism for moving the imaging optical system and the object toward each other and away from each other, thereby to control focusing/defocusing of illumination light with respect to the surface of the object, and in which the height calculator controls the focusing-direction drive mechanism in accordance with a height of a prescribed reference part of the object, thereby to control the control focusing/defocusing.

24. A height measuring apparatus according to claim 1, wherein the other optical position-detecting device comprises a photoacoustic element for continuously changing a diffraction angle and a light-detecting element for detecting a light beam diffracted by the photoacoustic element, and the height calculator calculates a change in the position of the spot on the basis of a signal generated by the light-detecting element and the diffraction angle detected by the photoacoustic element.

* * * * *